US012366176B2

(12) United States Patent
Capps

(10) Patent No.: US 12,366,176 B2
(45) Date of Patent: Jul. 22, 2025

(54) ROTOR SYSTEM FOR A TURBINE ENGINE

(71) Applicant: General Electric Company, Schenectady, NY (US)

(72) Inventor: Drew M. Capps, Avon, IN (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/456,671

(22) Filed: Aug. 28, 2023

(65) Prior Publication Data

US 2025/0075634 A1 Mar. 6, 2025

(51) Int. Cl.
*F01D 9/04* (2006.01)
*F01D 25/04* (2006.01)

(52) U.S. Cl.
CPC ............... *F01D 25/04* (2013.01); *F01D 9/04* (2013.01); *F05D 2220/323* (2013.01); *F05D 2240/12* (2013.01); *F05D 2240/24* (2013.01); *F05D 2260/961* (2013.01)

(58) Field of Classification Search
CPC . F01D 5/027; F01D 5/02; F01D 25/04; F01D 9/04; F05D 2220/323; F05D 2240/12; F05D 2240/24; F05D 2260/961
See application file for complete search history.

(56) References Cited

U.S. PATENT DOCUMENTS

| | | | | |
|---|---|---|---|---|
| 1,534,721 | A * | 4/1925 | Lasche | F01D 9/02 417/195 |
| 3,194,487 | A | 7/1965 | Tyler et al. | |
| 3,363,419 | A | 1/1968 | Wilde | |
| 5,169,288 | A | 12/1992 | Gliebe et al. | |
| 5,681,145 | A | 10/1997 | Neely et al. | |
| 7,011,495 | B2 | 3/2006 | Guemmer | |
| 8,152,473 | B2 | 4/2012 | Clemen | |
| 9,284,943 | B2 | 3/2016 | Zha et al. | |
| 9,890,649 | B2 * | 2/2018 | Thomassin | F01D 5/02 |
| 10,443,626 | B2 | 10/2019 | Mielke et al. | |
| 11,168,614 | B2 | 11/2021 | Morin et al. | |

(Continued)

FOREIGN PATENT DOCUMENTS

| | | | |
|---|---|---|---|
| FR | 3127024 | A1 | 3/2023 |
| FR | 3127025 | A1 | 3/2023 |
| JP | H0861001 | A | 3/1996 |

*Primary Examiner* — David E Sosnowski
*Assistant Examiner* — Theodore C Ribadeneyra
(74) *Attorney, Agent, or Firm* — Venable LLP; Peter T. Hrubiec; Michele V. Frank

(57) ABSTRACT

A rotor system for a turbine engine. The rotor system includes a rotor assembly and a stator assembly. The rotor assembly includes a plurality of rotor blades that rotate. The stator assembly includes a plurality of stator vanes arranged circumferentially about the stator assembly and includes at least one pair of non-uniform gaps between adjacent stator vanes. The plurality of stator vanes includes a first group of stator vanes having a first non-uniform gap between adjacent stator vanes, a second group of stator vanes having a second non-uniform gap between adjacent stator vanes, and a third group of stator vanes having a uniform spacing between adjacent stator vanes. The first non-uniform gap is positioned 180° from the second non-uniform gap. The plurality of rotor blades directs air through the plurality of stator vanes.

20 Claims, 13 Drawing Sheets

(56) References Cited

U.S. PATENT DOCUMENTS

| | | | | |
|---|---|---|---|---|
| 2005/0232763 | A1* | 10/2005 | Cormier | F01D 9/041 415/208.2 |
| 2006/0275127 | A1* | 12/2006 | Borufka | F01D 5/26 416/203 |
| 2010/0247310 | A1* | 9/2010 | Kelly | F01D 5/16 415/119 |
| 2012/0099995 | A1 | 4/2012 | Delvaux et al. | |
| 2013/0149135 | A1* | 6/2013 | Hield | F04D 29/544 415/208.2 |
| 2019/0360340 | A1* | 11/2019 | Lad | G01M 1/36 |

* cited by examiner

ROTOR SYSTEM FOR A TURBINE ENGINE

TECHNICAL FIELD

The present disclosure relates generally to rotor systems for turbine engines.

BACKGROUND

A turbine engine, for example, for an aircraft, generally includes a fan and a core section arranged in flow communication with one another. Such turbine engines typically include a rotor system including a rotor assembly having a plurality of rotor blades and a stator assembly having a plurality of stator vanes.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
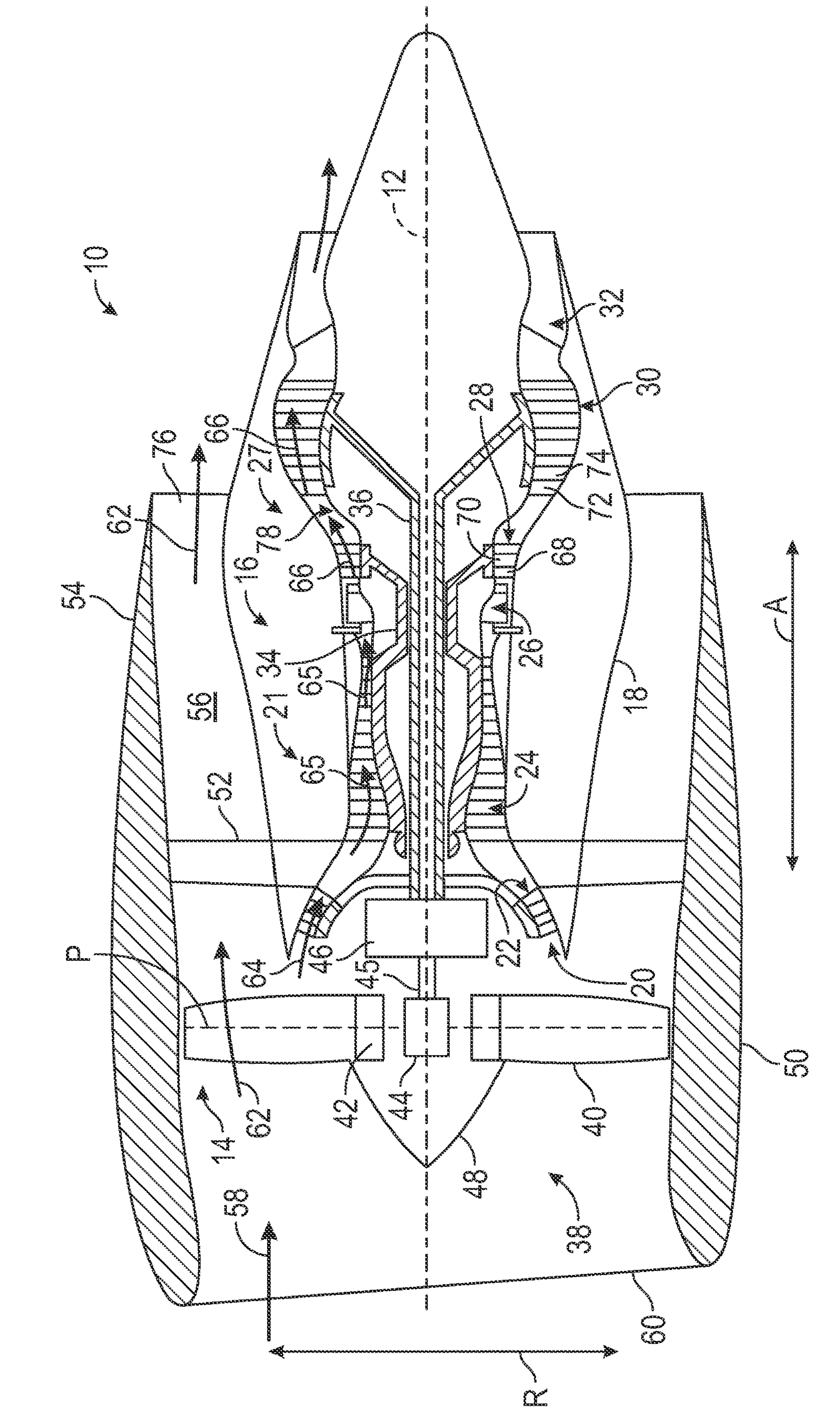
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms “first,” “second,” “third,” “fourth,” and “fifth” may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle and refer to the normal operational attitude of the turbine engine or vehicle. For example, with regard to a turbine engine, forward refers to a position closer to an engine inlet and aft refers to a position closer to an engine nozzle or exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "spacing" of stator vanes is a circumferential spacing between adjacent stator vanes of a stator assembly.

As used herein, "uniform spacing" of the stator vanes is a uniform spacing between at least two stator vanes being the same as the spacing between at least two other stator vanes.

As used herein, a "non-uniform gap" is defined by the spacing between at least two stator vanes being different than the spacing between at least two other stator vanes. In particular, a non-uniform gap is different than the uniform spacing.

As used herein, a "zero nodal diameter system response" is a vibrational response in which all of the stator vanes on the stator assembly are vibrating in phase with each other. Such a vibrational response generates an unbalanced force that is transmitted from the stator assembly.

As used herein, a "one nodal diameter system response" is a vibrational response in which the stator vanes on one half of the stator assembly (e.g., the stator vanes positioned at a circumferential position between 0° to 180° on the stator assembly) are vibrating 180° out of phase with the stator vanes on the other half of the stator assembly (e.g., the stator vanes positioned at a circumferential position between 180° to 360° on the stator assembly). Such a vibrational response generates an unbalanced moment that is transmitted from the stator assembly.

As used herein, a vibrational response is "balanced" about an axis N (e.g., an X-axis or a Y-axis) when the vibrational response exists for a pair of stator vanes on both sides of the axis N such that the absolute value of the amplitude of the vibrational response for each of the pair of stator vanes is substantially equal.

Turbine engines, for example, for aircraft, include rotor systems that include a rotor assembly having rotor blades and a stator assembly having stator vanes. For example, the rotor systems can include a fan of the turbine engine and a plurality of outlet guide vanes, one or more stages of compressor rotor blades and compressor stator vanes, or one or more stages of turbine rotor blades and turbine stator vanes. If there are a same number of uniformly spaced stator vanes as a number of rotor blades in the rotor system (e.g., or the number of stator vanes is any integer multiple of the number of rotor blades), a wake from the rotor blades will contact each of the stator vanes at the same time, which causes the stator vanes to vibrate together in phase. Such a configuration creates a force at the roots of the stator vanes that is not balanced within the stator assembly. For example, the force at the roots of the stator vanes causes an unbalanced force about the stator assembly due to a zero nodal diameter system response. As such, the system mode response (e.g., the vibrational response) of the stator assembly is unequilibrated and the vibrations propagate through the stator assembly and cause the stator assembly to shift, which causes a load that is carried by the turbine engine frame and the pylon that holds the turbine engine to the aircraft, as well as the wing of the aircraft.

To reduce, to eliminate, or to prevent the zero nodal diameter system response of the stator assembly, some turbine engines are configured to have uniformly spaced stator vanes with one fewer, or one more, stator vane on the stator assembly than the number of rotor blades on the rotor assembly (e.g., or any integer multiple of the number of rotor blades). Such a configuration, however, causes two halves (e.g., the left side and the right side or the top side and the bottom side) of the engine to vibrate out of phase with each other, which causes an unbalanced moment due to a one nodal diameter system response. As such, the system mode response (e.g., the vibrational response) of the stator assembly is unequilibrated and the unbalanced moment generates vibrations that propagate through the stator assembly and through the turbine engine frame, the pylon, and the wing.

The unequilibrated system mode response in a uniformly spaced stator assembly is managed by ensuring that the number of stator vanes of the stator assembly is different than the number of rotor blades of the rotor assembly by at least two or more (and any integer multiple of the number of rotor blades). For example, if there are thirty rotor blades on the rotor assembly, the stator assembly includes fewer than or equal to twenty-eight stator vanes or greater than or equal to thirty-two stator vanes. If the number of rotor blades is multiplied by two (e.g., an integer multiple of the number of rotor blades), the number of stator vanes is less than or equal to fifty-eight stator vanes or greater than or equal to sixty-two stator vanes. However, such configurations of the stator assembly may sacrifice aerodynamic performance and acoustic performances of the stator assembly. Further, the stator assembly may not be able to accommodate more than two additional stator vanes than rotor blades without increasing a size (e.g., a diameter) of the hub of the stator assembly, which increases a weight of the stator assembly and sacrificing aerodynamic performance and acoustic performance of the stator assembly.

Accordingly, the present disclosure provides a stator assembly having at least one pair of opposing non-uniform gaps between adjacent stator vanes to eliminate, or to prevent, at least one of the zero nodal diameter system response (e.g., the unbalanced force) or the one nodal diameter system response (e.g., the unbalanced moment). In particular, the present disclosure provides for the at least one pair of opposing non-uniform gaps to be separated by one hundred eighty degrees (180°). The rotor assembly includes rotor blades that are uniformly spaced circumferentially about the rotor assembly. The at least one pair of opposing non-uniform gaps of the stator assembly include one pair of opposing non-uniform gaps to eliminate, or to prevent, the at least one of the zero nodal diameter system response or the one nodal diameter system response. For example, the at least one pair of opposing non-uniform gaps of the stator assembly includes a first non-uniform gap between a first group of two adjacent stator vanes and a second non-uniform gap between a second group of two adjacent stator vanes. A third group of stator vanes is spaced by a uniform spacing and includes a remainder of the stator vanes of the stator assembly.

In one embodiment, the first non-uniform gap is different than the second non-uniform gap to eliminate, or to prevent, the zero nodal diameter system response. In another embodiment, the first non-uniform gap is equal to the second non-uniform gap to eliminate, or to prevent, the one nodal diameter system response. In such embodiments, the rotor assembly includes any even number of rotor blades, and the stator assembly includes any even number of stator vanes.

In another embodiment, the at least one pair of opposing non-uniform gaps includes two pairs of opposing non-uniform opposing gaps to eliminate, or to prevent, both the zero nodal diameter system response and the one nodal diameter system response. The two pairs of opposing non-uniform gaps include the first non-uniform gap, the second non-uniform gap, a third non-uniform gap, and a fourth non-uniform gap. The first non-uniform gap is spaced 180° from the second non-uniform gap, and the third non-uniform gap is spaced 180° from the fourth non-uniform gap. The third non-uniform gap and the fourth non-uniform gap are spaced ninety degrees (90°) from the first non-uniform gap and the second non-uniform gap. In such embodiments, the first non-uniform gap is equal to the second non-uniform gap, and the third non-uniform gap is equal to the fourth non-uniform gap. The third non-uniform gap and the fourth non-uniform gap are different than the first non-uniform gap and the second non-uniform gap. Further, in such embodiments, the rotor assembly includes any even number of rotor blades, and the stator assembly includes a number of stator vanes that is evenly divisible by four. Thus, the present disclosure provides for eliminating, or preventing, at least one of the zero nodal diameter system response (e.g., the unbalanced force) or the one nodal diameter system response (e.g., the unbalanced moment). In this way, the present disclosure provides for eliminating, or preventing, the zero nodal diameter system response, the one nodal diameter system response, or both the zero nodal diameter system response and the one nodal diameter system response.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison, as detailed further below. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of outlet guide vanes 52 that are spaced circumferentially about the nacelle 50. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flow path, or, more specifically, into the annular inlet 20 of the LP compressor 22. The ratio between the first portion of air 62 and the second portion of air 64 is commonly known as a bypass ratio. The pressure of the second portion of air 64 is then increased, forming compressed air 65, and the compressed air 65 is routed through the HP compressor 24 and into the combustion section 26, where the compressed air 65 is mixed with fuel and burned to generate combustion gases 66.

The combustion gases 66 are routed into the HP turbine 28 and expanded through the HP turbine 28 where a portion of thermal energy and/or kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, which supports operation of the HP compressor 24. The combustion gases 66 are then routed into the LP turbine 30 and expanded through the LP turbine 30. Here, a second portion of the thermal energy and/or kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, which supports operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, and/or turboshaft engines.

Figure 2:
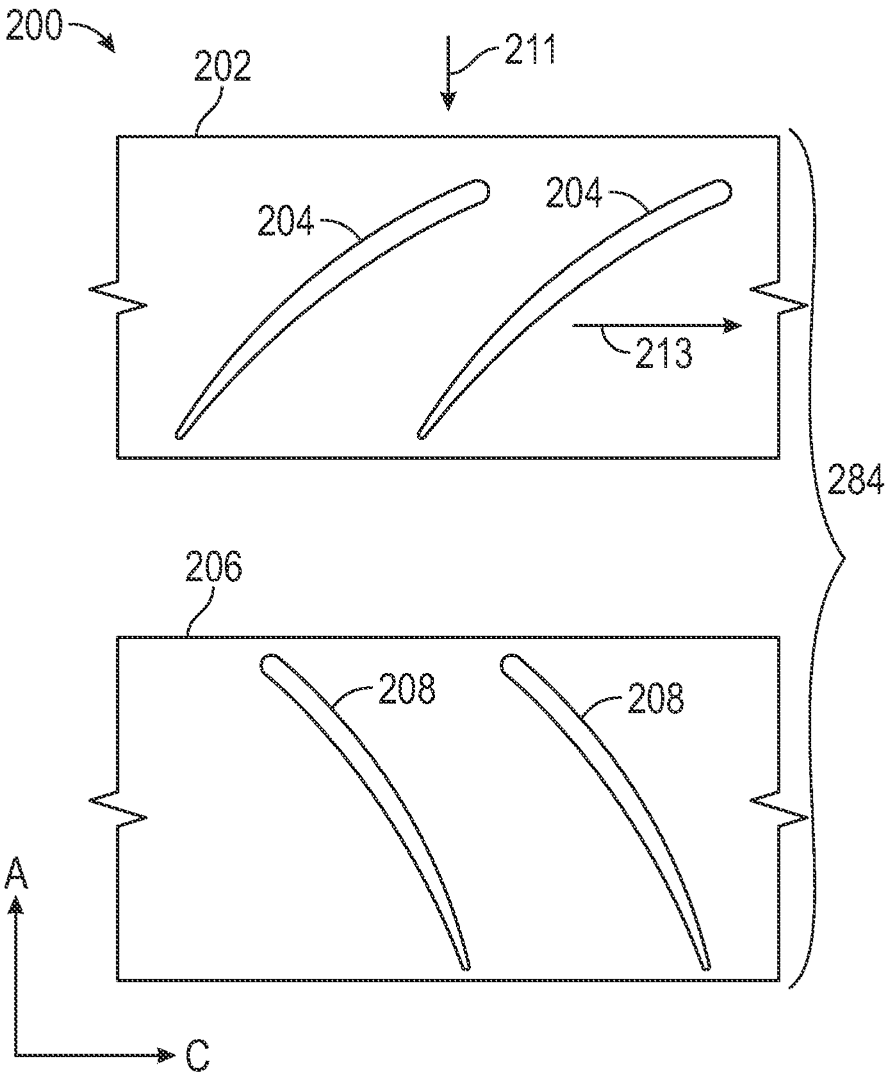
FIG. 2 is a schematic plan view of a portion of a rotor system for the turbine engine of FIG. 1, according to the present disclosure.

FIG. 2 is a schematic plan view of a portion of a rotor system 200 for the turbine engine 10 of FIG. 1, according to the present disclosure. The rotor system 200 can be utilized as any of the rotor systems of the turbine engine 10 that have one or more stages of rotating blades and static vanes. For example, the rotor system 200 can be utilized as the fan section 14 (e.g., the fan 38 and the plurality of outlet guide vanes 52), at least a portion of the compressor section 21, or at least a portion of the turbine section 27.

The rotor system 200 includes a rotor assembly 202 having a plurality of rotor blades 204 and a stator assembly 206 having a plurality of stator vanes 208. The plurality of rotor blades 204 is supported by rotor disks on the rotor assembly 202, and the rotor assembly 202 is coupled to a rotating shaft (e.g., the fan shaft 45, the HP shaft 34, or the LP shaft 36 of FIG. 1). The stator assembly 206 is a static component such that the stator assembly 206, and, thus, the plurality of stator vanes 208, does not rotate circumferentially. In some embodiments, the plurality of stator vanes 208 includes variable stator vanes such that the plurality of stator vanes 208 can be pitched about a pitch axis to change a pitch of the plurality of stator vanes 208. The stator assembly 206 is positioned downstream of the rotor assembly 202. As shown in FIG. 2, air 211 flows axially between the plurality of rotor blades 204 and the plurality of stator vanes 208. The rotor assembly 202 rotates (as indicated by arrow 213) to rotate the plurality of rotor blades 204 circumferentially about the longitudinal centerline axis 12 (FIG. 1). Rotation of the plurality of rotor blades 204 causes the air 211 to flow between the plurality of rotor blades 204. The plurality of stator vanes 208 directs the air 211 through the plurality of stator vanes 208. The plurality of rotor blades 204 is spaced uniformly about the rotor assembly 202. For example, the circumferential spacing between the plurality of rotor blades 204 is substantially equal. The plurality of stator vanes 208 includes both uniform spacing and non-uniform gaps, as detailed further below.

Figure 3:
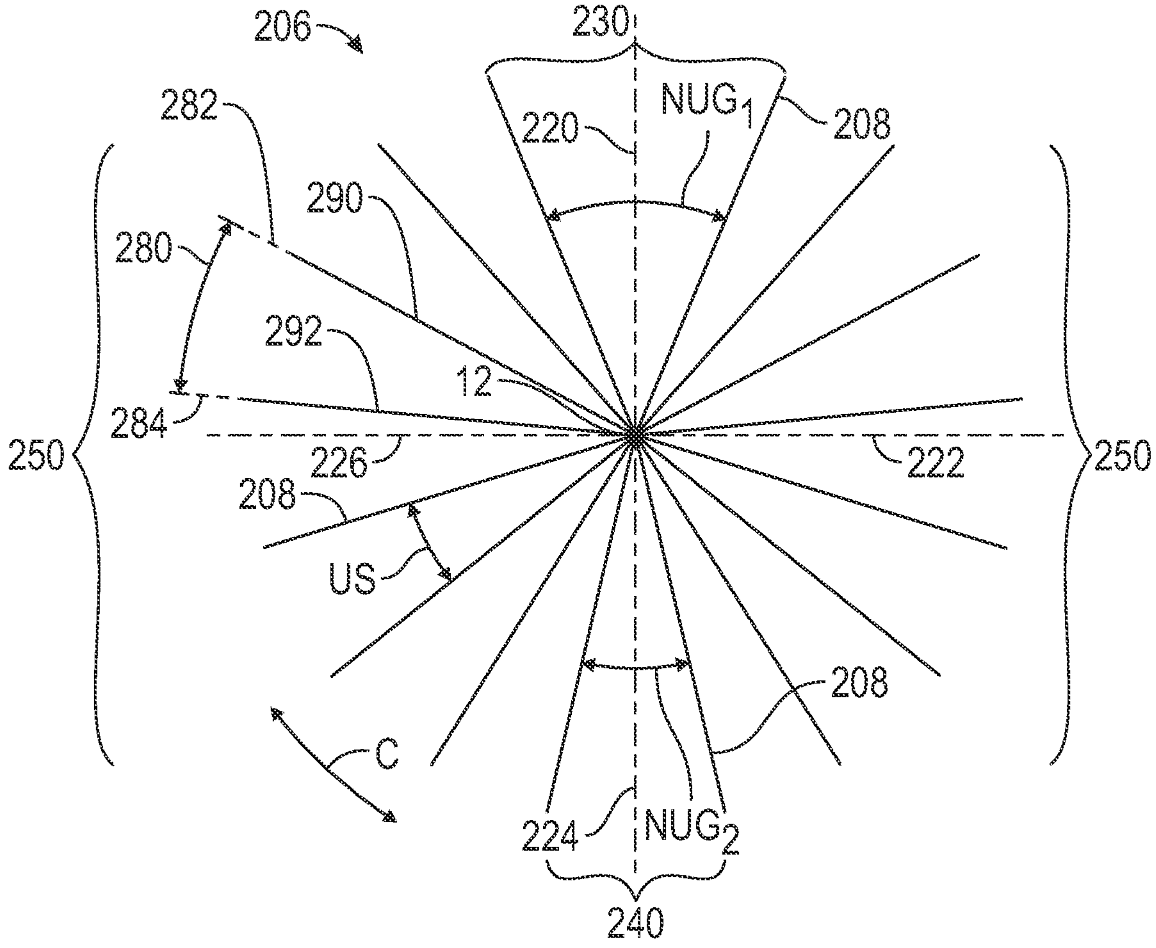
FIG. 3 is a schematic diagram of a front view of a stator assembly of the rotor system of FIG. 2, according to the present disclosure.

FIG. 3 is a schematic diagram of a front view of the stator assembly 206, according to the present disclosure. The plurality of stator vanes 208 includes sixteen stator vanes 208 that are spaced circumferentially about the stator assembly 206. The stator assembly 206 may be viewed with respect to a "clock" orientation having a twelve o'clock position 220, a three o'clock position 222, a six o'clock position 224, and a nine o'clock position 226. Although not provided with reference numerals, the clock orientation is understood to include all clock positions therebetween.

The stator assembly 206 is divided into three groups including a first group of stator vanes 230, a second group of stator vanes 240, and a third group of stator vanes 250. The first group of stator vanes 230 includes two stator vanes 208, the second group of stator vanes 240 includes two stator vanes 208, and the third group of stator vanes 250 includes a remainder of the number of stator vanes 208. In the first group of stator vanes 230, adjacent stator vanes 208 have a first non-uniform gap ($NUG_1$). Adjacent stator vanes 208 are defined as two stator vanes 208 that are directly circumferentially next to each other with no intervening stator vanes 208. In the second group of stator vanes 240, adjacent stator vanes 208 have a second non-uniform gap ($NUG_2$). In the third group of stator vanes 250, adjacent stator vanes 208 have a uniform spacing (US). There are two third groups of stator vanes 250 that are positioned between the first group of stator vanes 208 and the second group of stator vanes 208.

The stator assembly 206 includes a circumferential spacing of the plurality of stator vanes 208 that includes at least one pair of non-uniform gaps (NUGs), including the first non-uniform gap $NUG_1$ and the second non-uniform gap $NUG_2$. A non-uniform gap is defined by the spacing between at least two stator vanes 208 being different than the spacing between at least two other stator vanes 208. The at least one pair of non-uniform gaps $NUG_1$, $NUG_2$ are opposite each other. For example, the first non-uniform gap $NUG_1$ is spaced one hundred and eighty degrees (180°) from the second non-uniform gap $NUG_2$. In FIG. 3, the first non-uniform gap $NUG_1$ is positioned at the twelve o'clock position 220, and the second non-uniform gap $NUG_2$ is positioned at the six o'clock position 224. The first non-uniform gap $NUG_1$ and the second non-uniform gap $NUG_2$ can be positioned at any "clock" position on the stator assembly 206 as long as the first non-uniform gap $NUG_1$ is spaced one hundred and eighty degrees (180°) from the second non-uniform gap $NUG_2$.

The stator assembly 206 also includes stator vanes 208 that are spaced by the uniform spacing US between stator vanes 208 that are not spaced by the at least one pair of non-uniform gaps $NUG_1$, $NUG_2$. For example, all remaining stator vanes 208 that are not spaced by the at least one pair of non-uniform gaps $NUG_1$, $NUG_2$ are spaced by the uniform spacing US. In FIG. 3, for example, there are two stator vanes 208 that are spaced by the first non-uniform gap $NUG_1$, two stator vanes 208 that are spaced by the second non-uniform gap $NUG_2$, and twelve stator vanes 208 that are spaced by the uniform spacing US. In this way, there are fourteen spaces that are spaced by the uniform spacing US, one space that is spaced by the first non-uniform gap $NUG_1$, and one space that is spaced by the second non-uniform gap $NUG_2$. A majority (e.g., greater than 50%) of the stator vanes 208 are spaced by the uniform spacing US.

The at least one pair of non-uniform gaps $NUG_1$, $NUG_2$ and the uniform spacing US may be defined by an angular measurement. The angular measurement is defined by a spacing measured with respect to an angle created between adjacent stator vanes 208. For example, an angle 280 may be defined between an axis 282 of a first stator vane 290 extending through and perpendicular to the longitudinal centerline axis 12 and an axis 284 of a second, adjacent stator vane 292 extending through and perpendicular to the longitudinal centerline axis 12. The measured angle 280 defines the uniform spacing US. Although the angular measurement is shown, by way of example only, in the third group of stator vanes 250 to define the uniform spacing US, an angular measurement is also used to determine the first non-uniform gap $NUG_1$ and the second non-uniform gap $NUG_2$. The angular measurements of the first non-uniform gap $NUG_1$ and the second non-uniform gap $NUG_2$ may be measured between axis of adjacent stator vanes as described with respect to the first spacing Si.

The first non-uniform gap $NUG_1$ is different from (e.g., not equal to) the second non-uniform gap $NUG_2$. The uniform spacing US is different from the first non-uniform gap $NUG_1$ and the second non-uniform gap $NUG_2$. Such a configuration eliminates the zero nodal diameter system response by having the vibratory response be balanced, as detailed further below with respect to the example of FIGS. 4A to 4D. The first non-uniform gap $NUG_1$ is greater than the second non-uniform gap $NUG_2$. The first non-uniform gap $NUG_1$ is determined based on relationship (1), and the second non-uniform gap $NUG_2$ is determined based on relationship (2):

$$NUG_1 = 180° + \frac{180°}{N_B} - \left(\frac{(N_S - 2)}{2}\right)US; \text{ and} \tag{1}$$

$$NUG_2 = 360° - NUG_1 - (N_S - 2)US. \tag{2}$$

In relationships (1) and (2), $N_B$ is a number of rotor blades 204 on the rotor assembly 202, $N_S$ is a number of stator vanes 208 on the stator assembly 206, and US is the uniform spacing as detailed further below. $N_B$ and $N_S$ are selected such that the plurality of rotor blades 204 includes an even number of rotor blades 204 and the plurality of stator vanes 208 includes an even number of stator vanes 208, respectively.

Figure 4A:
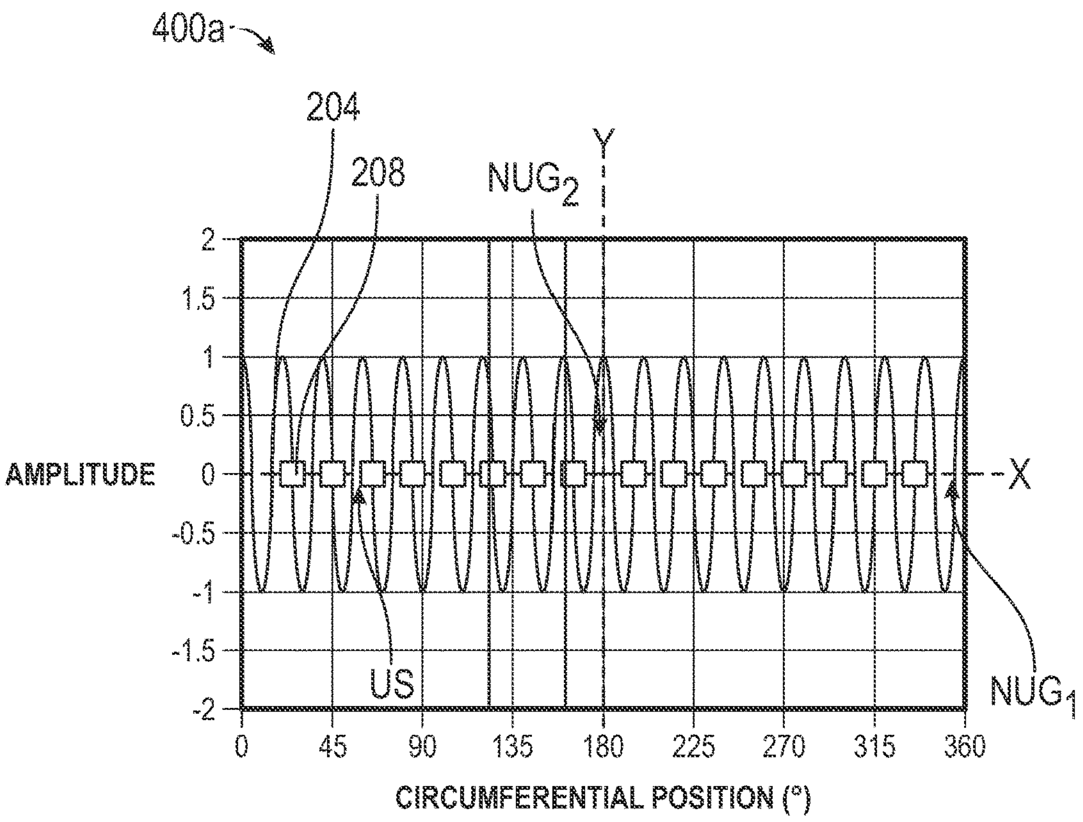
FIG. 4A illustrates a graph of a waveform of a stimulus (e.g., a pressure change) from rotor blades of the rotor system of FIG. 2 at an initial condition (0° phase) and a vibration response on stator vanes of the stator assembly of FIG. 3, according to the present disclosure.
Figure 4B:
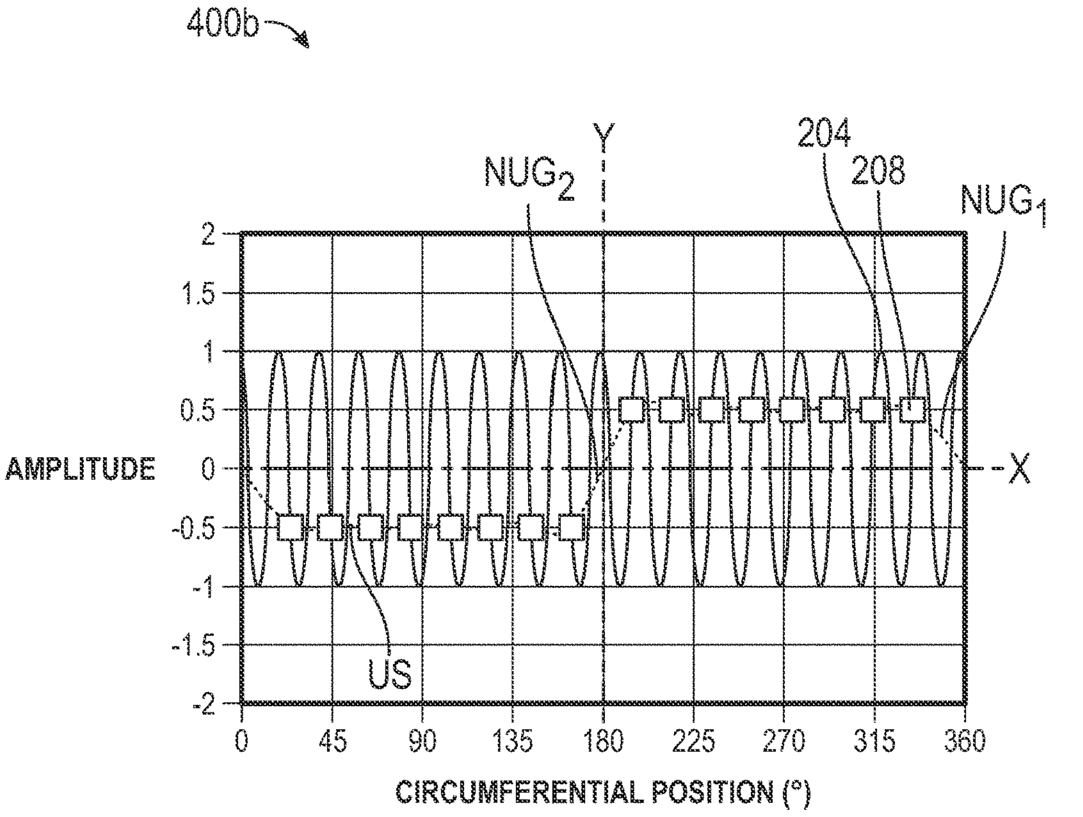
FIG. 4B illustrates a graph of the waveform of the stimulus from the rotor blades of the rotor system of FIG. 2 at a 30° phase shift and the vibration response on the stator vanes of the stator assembly of FIG. 3, according to the present disclosure.
Figure 4C:
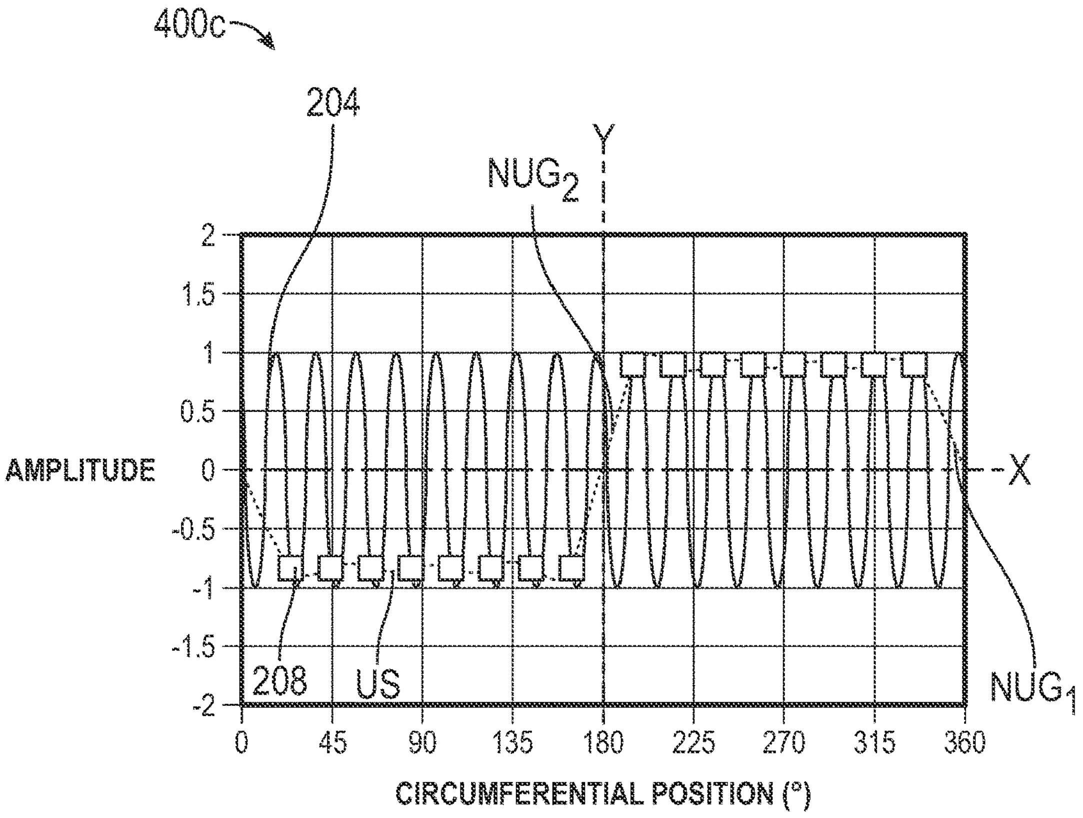
FIG. 4C illustrates a graph of the waveform of the stimulus from the rotor blades of the rotor system of FIG. 2 at a 60° phase shift and the vibration response on the stator vanes of the stator assembly of FIG. 3, according to the present disclosure.
Figure 4D:
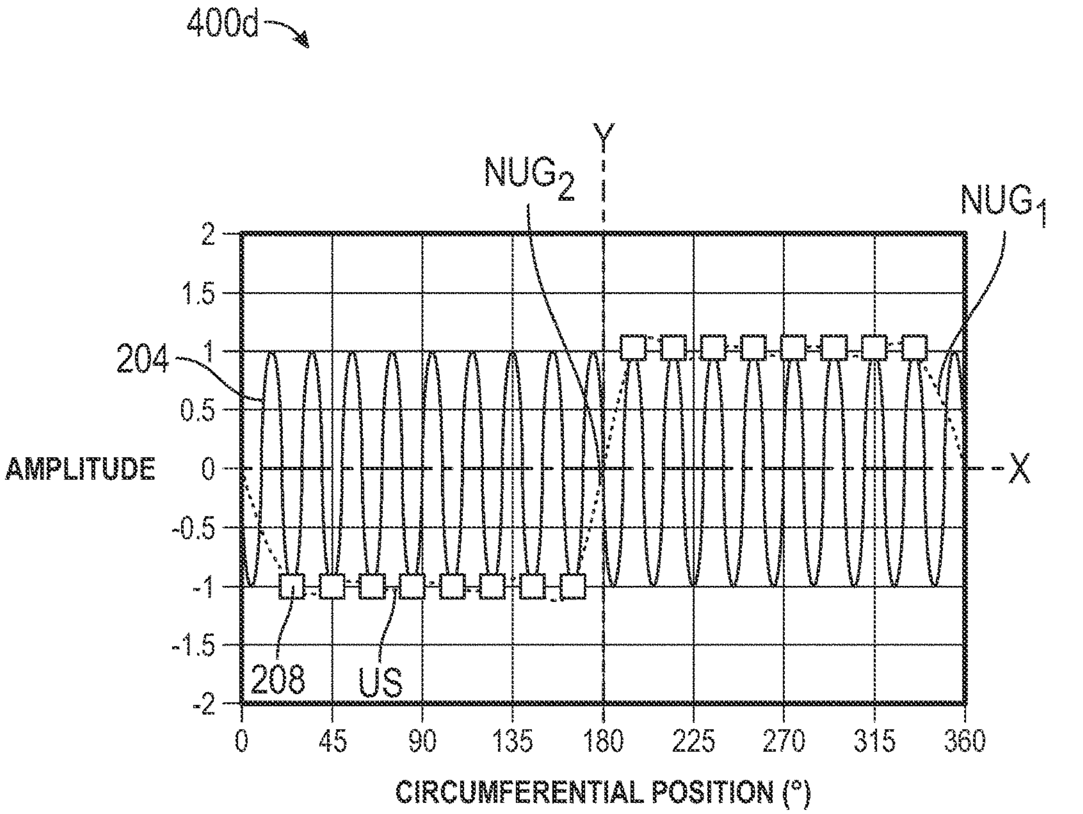
FIG. 4D illustrates a graph of the waveform of the stimulus from the rotor blades of the rotor system of FIG. 2 at a 90° phase shift and the vibration response on the stator vanes of the stator assembly of FIG. 3, according to the present disclosure.

FIGS. 4A to 4D illustrate exemplary graphs of a waveform of a stimulus (e.g., pressure changes) from the rotor blades 204 on each of the stator vanes 208 at various phases, according to the present disclosure. The waveform of the rotor blades 204 is a sinusoidal waveform. FIG. 4A illustrates a graph 400*a* of the waveform of the rotor blades 204 at an initial condition (0° phase). FIG. 4B illustrates a graph 400*b* of the waveform of the rotor blades 204 at a 30° phase shift. FIG. 4C illustrates a graph 400*c* of the waveform of the rotor blades 204 at a 60° phase shift. FIG. 4D illustrates a graph 400*d* of the waveform of the rotor blades 204 at a 90° phase shift. In FIGS. 4A to 4D, the rotor blades 204 are represented by a sine wave as the rotor blades 204 rotate, and the stator vanes 208 are represented by squares at various circumferential positions of the stator assembly 206 (FIG. 2). FIGS. 4A to 4D show the uniform spacing US, the first non-uniform gap $NUG_1$, and the second non-uniform gap $NUG_2$.

FIGS. 4A to 4D illustrate a first example of the at least one pair of non-uniform gaps $NUG_1$, $NUG_2$, and the uniform spacing US. In this example, the rotor assembly 202 includes eighteen rotor blades 204 and the stator assembly 206 includes sixteen stator vanes 208. The uniform spacing US can be any uniform spacing and is selected based on a balance of acoustics, aerodynamics, mechanical design integration, or the like. For example, the uniform spacing US is twenty degrees (20°) such that the stator vanes 208 would be spaced 20° from each other if there were eighteen stator vanes 208 (e.g., 360°/18 equals 20°). The first non-uniform gap $NUG_1$ is determined by relationship (1), and the second non-uniform gap $NUG_2$ is determined by relationship (2), above. Thus, if $N_B$ is eighteen, $N_S$ is sixteen, and the uniform spacing US is 20°, then the first non-uniform gap $NUG_1$ is fifty degrees (50°) per relationship (1), and the second non-uniform gap $NUG_2$ is thirty degrees (30°) per relationship (2).

As shown in FIGS. 4A to 4D, the vibration response on the stator vanes 208 is balanced about the X-axis. For example, the vibration response of the eight stator vanes 208 that are positioned between 0° to 180° on the stator assembly 206 moves from zero amplitude to negative one (−1) amplitude as the phase changes from the initial condition (graph 400*a* in FIG. 4A) to the 90° phase shift (graph 400*d* in FIG. 4D). The vibration response on the eight stator vanes 208 that are positioned between 180° to 360° on the stator assembly 206 moves from zero amplitude to positive one (1) amplitude as the phase changes from the initial condition (graph 400*a* in FIG. 4A) to the 90° phase shift (graph 400*d* in FIG. 4D). In this way, there are eight stator vanes 208 that approach the negative one amplitude, and there are eight stator vanes 208 that approach the positive one amplitude such that the vibration response of the stator vanes 208 is balanced about the X-axis. Accordingly, the stator assembly 206 having at least one pair of non-uniform gaps $NUG_1$, $NUG_2$ that are different eliminates the zero nodal diameter system response, and the unbalanced force between the twelve o'clock position 220 and the six o'clock position 224 is eliminated as compared to stator assemblies without the benefit of the present disclosure. Thus, the stator assembly 206 having at least one pair of non-uniform gaps $NUG_1$, $NUG_2$ that are different prevents the zero nodal diameter system response (e.g., prevents the unbalanced force) through the turbine engine 10 (FIG. 1).

Figure 5:
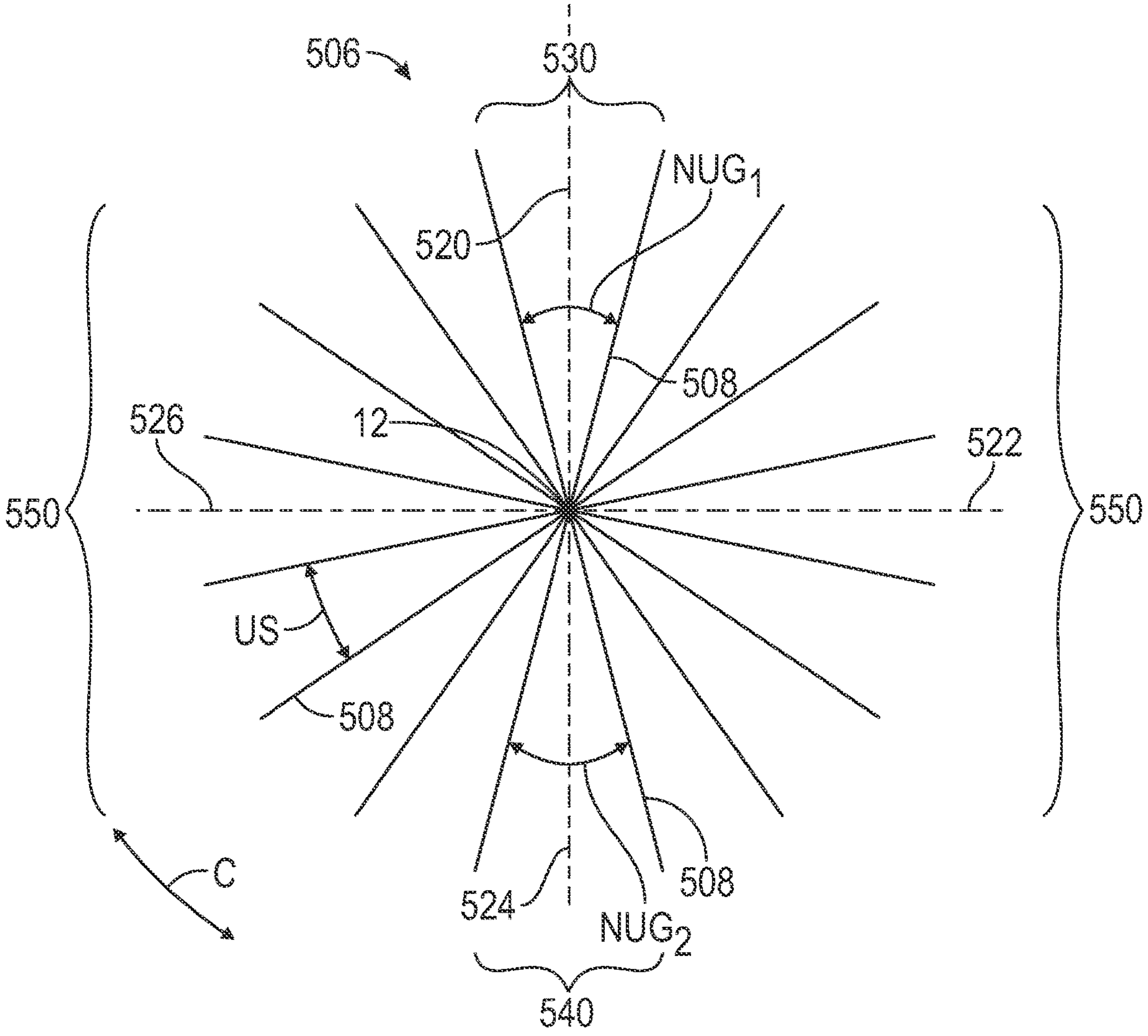
FIG. 5 is a schematic diagram of a front view of a stator assembly, according to another embodiment.

FIG. 5 is a schematic diagram of a front view of a stator assembly 506, according to another embodiment. The stator assembly 506 includes a plurality of stator vanes 508 and can be utilized as the stator assembly 206 in the rotor system 200 of FIG. 2. The plurality of stator vanes 508 includes sixteen stator vanes 508 that are spaced circumferentially about the stator assembly 506. The stator assembly 506 may be viewed with respect to a "clock" orientation having a twelve o'clock position 520, a three o'clock position 522, a six o'clock position 524, and a nine o'clock position 526. Although not provided with reference numerals, the clock orientation is understood to include all clock positions therebetween.

The stator assembly 506 is divided into three groups including a first group of stator vanes 530, a second group of stator vanes 540, and a third group of stator vanes 550. The first group of stator vanes 530 includes two stator vanes 508, the second group of stator vanes 540 includes two stator vanes 508, and the third group of stator vanes 550 includes a remainder of the number of stator vanes 508. In the first group of stator vanes 530, adjacent stator vanes 508 have a first non-uniform gap ($NUG_1$). In the second group of stator vanes 540, adjacent stator vanes 508 have a second non-uniform gap ($NUG_2$). In the third group of stator vanes 550, adjacent stator vanes 508 have a uniform spacing (US). There are two third groups of stator vanes 550 that are positioned between the first group of stator vanes 530 and the second group of stator vanes 540.

The stator assembly 506 includes a circumferential spacing of the plurality of stator vanes 508 that includes at least one pair of non-uniform gaps (NUGs), including the first non-uniform gap $NUG_1$ and the second non-uniform gap $NUG_2$. The at least one pair of non-uniform gaps $NUG_1$, $NUG_2$ are opposite each other. For example, the first non-uniform gap $NUG_1$ is spaced one hundred and eighty degrees (180°) from the second non-uniform gap $NUG_2$. In FIG. 5, the first non-uniform gap $NUG_1$ is positioned at the twelve o'clock position 520, and the second non-uniform gap $NUG_2$ is positioned at the six o'clock position 524. The first non-uniform gap $NUG_1$ and the second non-uniform gap $NUG_2$ can be positioned at any "clock" position on the stator assembly 506 as long as the first non-uniform gap $NUG_1$ is spaced one hundred and eighty degrees (180°) from the second non-uniform gap $NUG_2$.

The stator assembly 506 also includes stator vanes 508 that are spaced by the uniform spacing US between stator vanes 508 that are not spaced by the at least one pair of non-uniform gaps $NUG_1$, $NUG_2$. For example, all remaining stator vanes 508 that are not spaced by the at least one pair of non-uniform gaps $NUG_1$, $NUG_2$ are spaced by the uniform spacing US. In FIG. 5, there are two stator vanes 508 that are spaced by the first non-uniform gap $NUG_1$, two stator vanes 508 that are spaced by the second non-uniform gap $NUG_2$, and twelve stator vanes 508 that are spaced by the uniform spacing US. In this way, there are fourteen spaces that are spaced by the uniform spacing US, one space that is spaced by the first non-uniform gap $NUG_1$, and one space that is spaced by the second non-uniform gap $NUG_2$. The at least one pair of non-uniform gaps $NUG_1$, $NUG_2$, and the uniform spacing US may be defined by an angular measurement, as detailed above with respect to FIG. 3.

The first non-uniform gap $NUG_1$ is equal to the second non-uniform gap $NUG_2$. The uniform spacing US is different from the first non-uniform gap $NUG_1$ and the second non-uniform gap $NUG_2$. Such a configuration eliminates the one nodal diameter system response by having the vibratory response be balanced, as detailed further below with respect to the example of FIGS. 6A to 6D. In FIG. 5, the first non-uniform gap $NUG_1$ and the second non-uniform gap $NUG_2$ are determined based on three hundred sixty degrees (360°), minus the number of gaps that are spaced by the uniform spacing US, multiplied by the uniform spacing US, and divided by the number of non-uniform gaps.

Figure 6A:
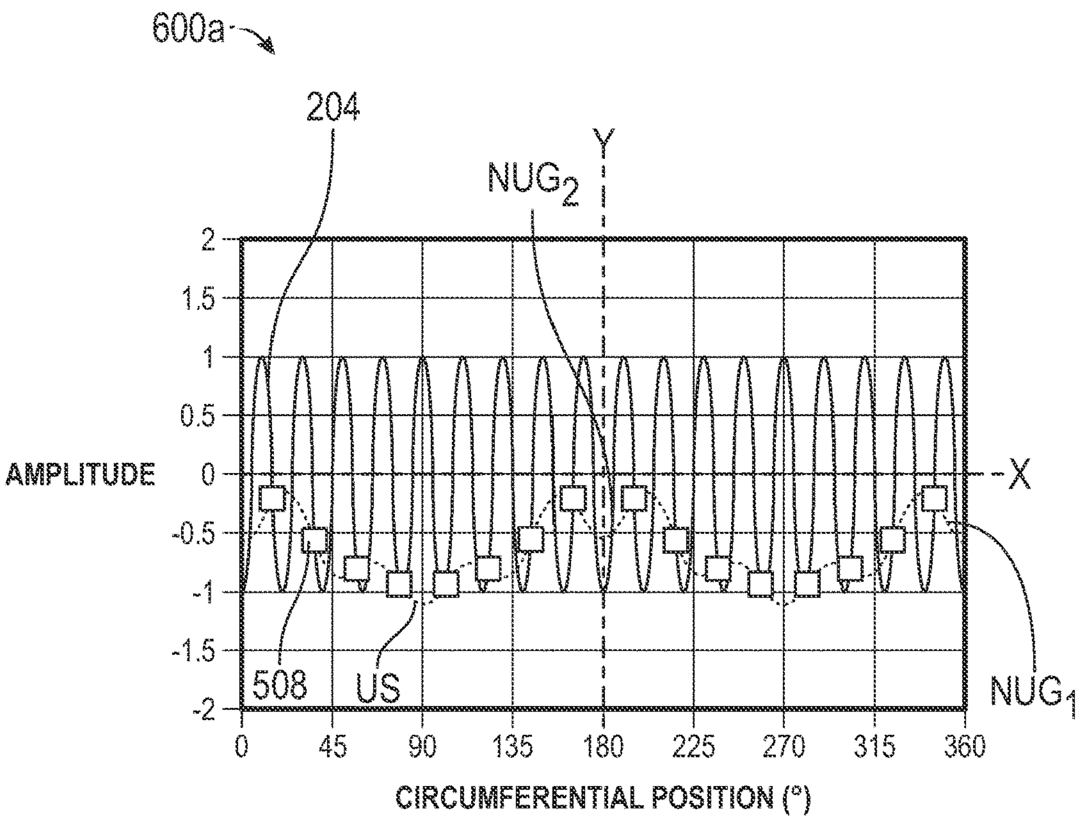
FIG. 6A illustrates a graph of a waveform of a stimulus of rotor blades of the rotor system of FIG. 2 at an initial condition (0° phase) and a vibration response on stator vanes of the stator assembly of FIG. 5, according to the present disclosure.
Figure 6B:
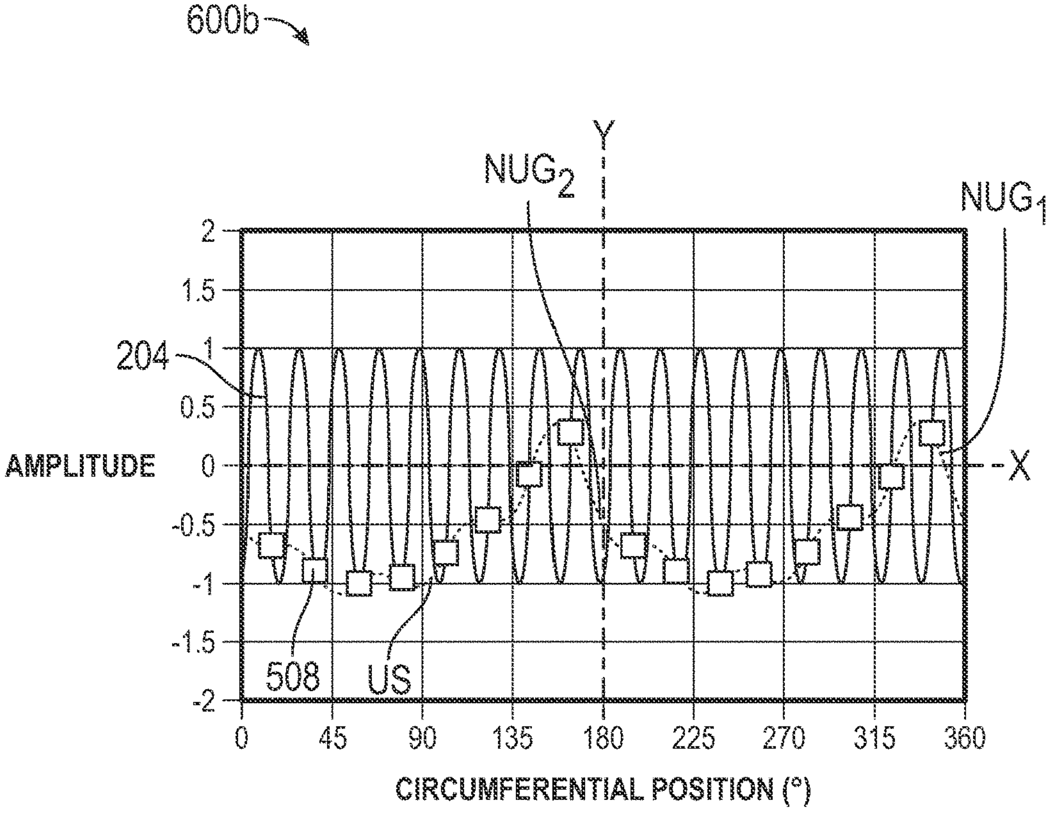
FIG. 6B illustrates a graph of the waveform of the stimulus of the rotor blades of the rotor system of FIG. 2 at a 30° phase shift and the vibration response on the stator vanes of the stator assembly of FIG. 5, according to the present disclosure.
Figure 6C:
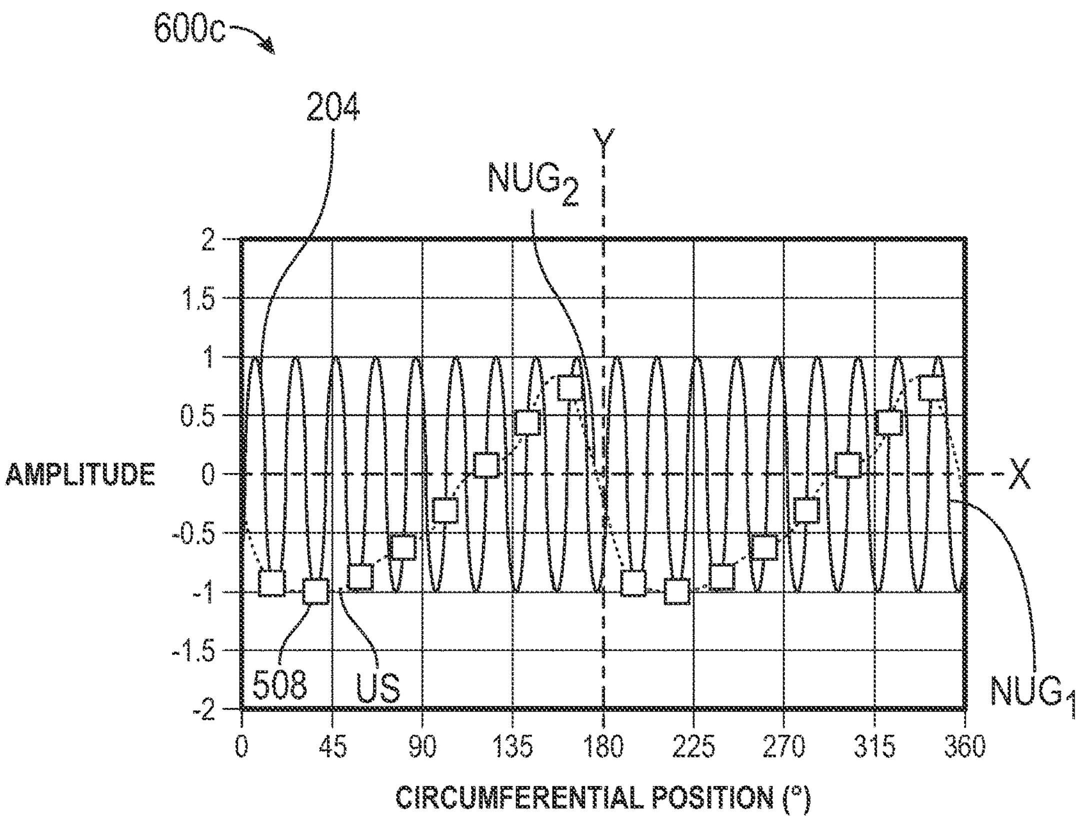
FIG. 6C illustrates a graph of the waveform of the stimulus of the rotor blades of the rotor system of FIG. 2 at a 60° phase shift and the vibration response on the stator vanes of the stator assembly of FIG. 5, according to the present disclosure.
Figure 6D:
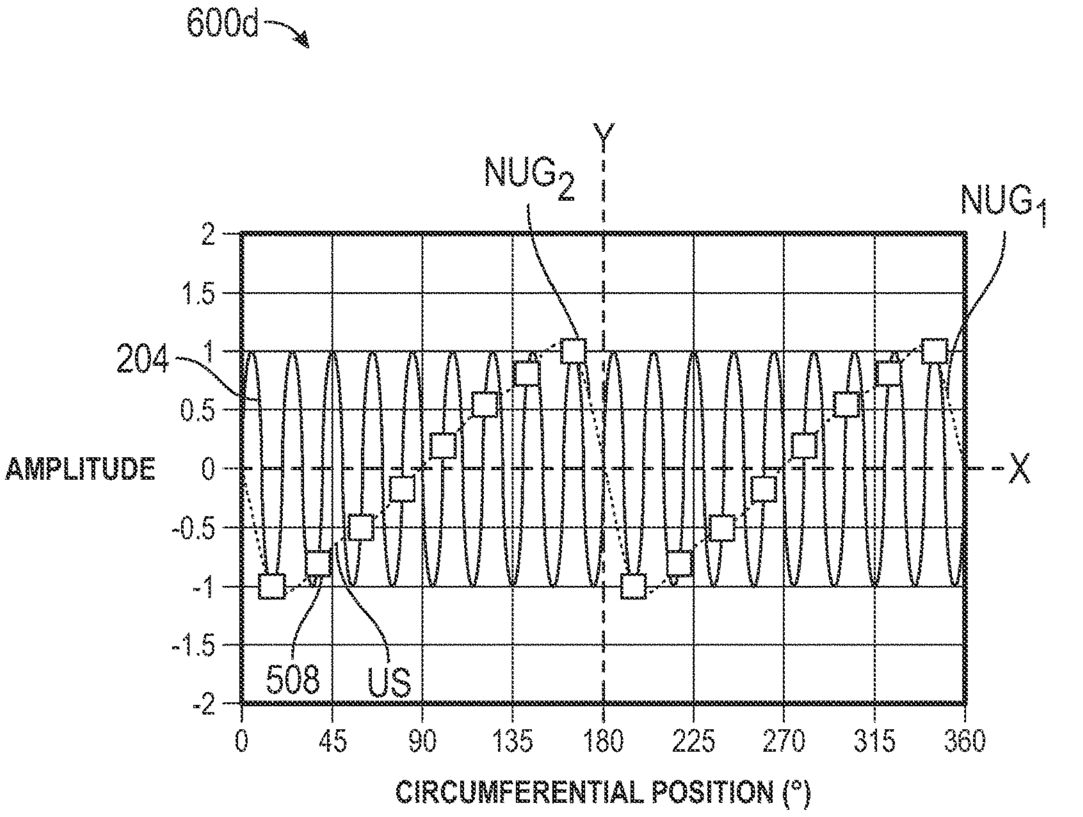
FIG. 6D illustrates a graph of the waveform of the stimulus of the rotor blades of the rotor system of FIG. 2 at a 90° phase shift and the vibration response on the stator vanes of the stator assembly of FIG. 5, according to the present disclosure.

FIGS. 6A to 6D illustrate exemplary graphs of a waveform of a stimulus from the rotor blades 204 on each of the stator vanes 508 at various phases, according to the present disclosure. The waveform of the rotor blades 204 is a sinusoidal waveform. FIG. 6A illustrates a graph 600*a* of the waveform of the rotor blades 204 at an initial condition (0° phase). FIG. 6B illustrates a graph 600*b* of the waveform of the rotor blades 204 at a 30° phase shift. FIG. 6C illustrates a graph 600*c* of the waveform of the rotor blades 204 at a 60° phase shift. FIG. 6D illustrates a graph 600*d* of the waveform of the rotor blades 204 at a 90° phase shift. In FIGS. 6A to 6D, the stimulus of the rotor blades 204 is represented by a sine wave as the rotor blades 204 rotate, and the stator vanes 508 are represented by squares at various circumferential positions of the stator assembly 506 (FIG. 5). FIGS. 6A to 6D show the uniform spacing US, the first non-uniform gap $NUG_1$, and the second non-uniform gap $NUG_2$.

FIGS. 6A to 6D illustrate a second example of the at least one pair of non-uniform gaps $NUG_1$, $NUG_2$, and the uniform spacing US. In this example, the rotor assembly 202 includes eighteen rotor blades 204 and the stator assembly 506 includes sixteen stator vanes 508. The uniform spacing US is selected based on a uniform spacing if there was one fewer stator vane 208 than the number of rotor blades 204. For example, the uniform spacing US is approximately twenty-one point two degrees (21.2°) such that the stator vanes 508 would be spaced approximately 21.2° from each other if there were seventeen stator vanes 508 (e.g., 360°/17 equals approximately 21.2°). The first non-uniform gap $NUG_1$ and the second non-uniform gap $NUG_2$ are determined by a remainder of the spacing after the uniform spacing US has been subtracted from 360°, and the first non-uniform gap $NUG_1$ equals the second non-uniform gap $NUG_2$. For example, if $N_S$ is sixteen and there are two non-uniform gaps (e.g., $NUG_1$, $NUG_2$), then there are fourteen gaps between stator vanes 508 that are spaced by the uniform spacing US. The first non-uniform gap $NUG_1$ and the second non-uniform gap $NUG_2$ are equal to three hundred sixty degrees (360°) minus fourteen (e.g., the number of gaps spaced by the uniform spacing US) multiplied by twenty-one point two degrees (21.2°) (e.g., the uniform spacing US) and divided by two (e.g., the number of non-uniform gaps). Accordingly, the first non-uniform gap $NUG_1$ and the second non-uniform gap $NUG_2$ are approximately thirty-one point six degrees (31.6°) (e.g., 360°−14*21.2°=63.2°/2=31.6°).

As shown in FIGS. 6A to 6D, the vibration response on the stator vanes 508 is balanced about the Y-axis. For example, the vibration response of the eight stator vanes 508 that are positioned between 0° to 180° on the stator assembly 506 is equal to the vibration response of the eight stator vanes 508 that are positioned between 180° to 360° on the stator assembly 506 as the phase changes from the initial condition (graph 600*a* in FIG. 6D) to the 90° phase shift (graph 600*d* in FIG. 6D). In this way, the vibration response of the eight stator vanes 508 that are positioned between 0° to 180° on the stator assembly 506 is repeated by the vibration response of the eight stator vanes 508 that are positioned between 180° to 360° about the Y-axis such that the vibration response of the stator vanes 508 is balanced about the Y-axis. Accordingly, the stator assembly 506 having at least one pair of non-uniform gaps $NUG_1$, $NUG_2$ that are equal eliminates the one nodal diameter system response, and the unbalanced moment between the three o'clock position 522 and the nine o'clock position 526 is eliminated as compared to stator assemblies without the benefit of the present disclosure. Thus, the stator assembly 506 has at least one pair of non-uniform gaps $NUG_1$, $NUG_2$ that are equal prevents the one nodal diameter system response (e.g., prevents the unbalanced moment) through the turbine engine 10 (FIG. 1).

Figure 7:
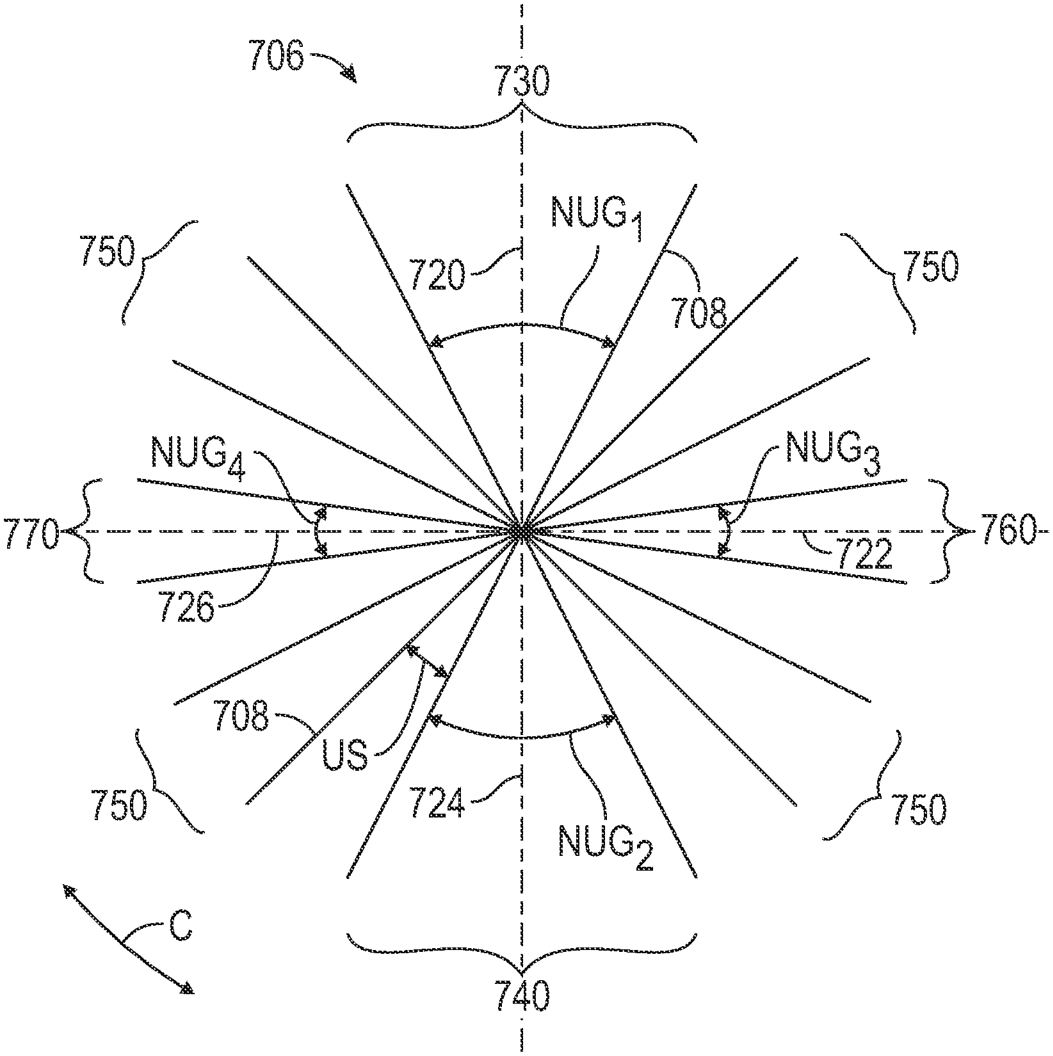
FIG. 7 is a schematic diagram of a front view of a stator assembly, according to another embodiment.

FIG. 7 is a schematic diagram of a front view of a stator assembly 706, according to another embodiment. The stator assembly 706 includes a plurality of stator vanes 708 and can be utilized as the stator assembly 206 in the rotor system 200 of FIG. 2. The plurality of stator vanes 708 includes sixteen stator vanes 708 that are spaced circumferentially about the stator assembly 706. The stator assembly 706 may be viewed with respect to a "clock" orientation having a twelve o'clock position 720, a three o'clock position 722, a six o'clock position 724, and a nine o'clock position 726. Although not provided with reference numerals, the clock orientation is understood to include all clock positions therebetween.

The stator assembly 706 is divided into five groups including a first group of stator vanes 730, a second group of stator vanes 740, a third group of stator vanes 750, a fourth group of stator vanes 760, and a fifth group of stator vanes 770. The first group of stator vanes 730 includes two stator vanes 708, the second group of stator vanes 740 includes two stator vanes 708, the third group of stator vanes 750 includes a remainder of the number of stator vanes 708, the fourth group of stator vanes 760 includes two stator vanes 708, and the fifth group of stator vanes 770 includes two stator vanes 708. In the first group of stator vanes 730, adjacent stator vanes 708 have a first non-uniform gap ($NUG_1$). In the second group of stator vanes 740, adjacent stator vanes 708 have a second non-uniform gap ($NUG_2$). In the third group of stator vanes 750, adjacent stator vanes 708 have a uniform spacing (US). In the fourth group of stator vanes 760, adjacent stator vanes 708 have a third non-uniform gap ($NUG_3$). In the fifth group of stator vanes 770, adjacent stator vanes 708 have a fourth non-uniform gap ($NUG_4$). There are eight stator vanes 708 in the third group of stators vanes 750 including two stator vanes 708 of the third group of stator vanes 750 positioned between the first group of stator vanes 730 and the fourth group of stator vanes 760, between the fourth group of stator vanes 760 and the second group of stator vanes 740, between the second group of stator vanes 740 and the fifth group of stator vanes 770, and between the fifth group of stator vanes 770 and the first group of stator vanes 730. In FIG. 7, each stator vane 708 of the third group of stator vanes 750 is positioned by the uniform spacing US from adjacent stator vanes 708 of the first group of stator vanes 730, the second group of stator vanes 740, the fourth group of stator vanes 760, and the fifth group of stator vanes 770.

The stator assembly 706 includes a circumferential spacing of the plurality of stator vanes 708 that includes at least two pairs of non-uniform gaps (NUGs), including a first pair of non-uniform gaps $NUG_1$, $NUG_2$, and a second pair of non-uniform gaps $NUG_3$, $NUG_4$. The first pair of non-uniform gaps $NUG_1$, $NUG_2$ includes the first non-uniform gap $NUG_1$ and the second non-uniform gap $NUG_2$. The second pair of non-uniform gaps $NUG_3$, $NUG_4$ includes the third non-uniform gap $NUG_3$ and the fourth non-uniform gap $NUG_4$. The first pair of non-uniform gaps $NUG_1$, $NUG_2$ is opposite each other. For example, the first non-uniform gap $NUG_1$ is spaced one hundred and eighty degrees (180°) from the second non-uniform gap $NUG_2$. The second pair of non-uniform gaps $NUG_3$, $NUG_4$ is opposite each other. For example, the third non-uniform gap $NUG_3$ is spaced one hundred and eighty degrees (180°) from the fourth non-uniform gap $NUG_4$. In FIG. 7, the first non-uniform gap $NUG_1$ is positioned at the twelve o'clock position 720, the second non-uniform gap $NUG_2$ is positioned at the six o'clock position 724, the third non-uniform gap $NUG_3$ is positioned at the three o'clock position 722, and the fourth non-uniform gap $NUG_4$ is positioned at the nine o'clock position 726. In this way, the second pair of non-uniform gaps $NUG_3$, $NUG_4$ is positioned ninety degrees (90°) from the first pair of non-uniform gaps $NUG_1$, $NUG_2$. The first non-uniform gap $NUG_1$, the second non-uniform gap $NUG_2$, the third non-uniform gap $NUG_3$, and the fourth non-uniform gap $NUG_4$ can be positioned at any "clock" position on the stator assembly 706 as long as the first non-uniform gap $NUG_1$ is spaced 180° from the second non-uniform gap $NUG_2$, the third non-uniform gap $NUG_3$ is spaced 180° from the fourth non-uniform gap $NUG_4$, and the first pair of non-uniform gaps $NUG_1$, $NUG_2$ is spaced 90° from the second pair of non-uniform gaps $NUG_3$, $NUG_4$.

The stator assembly 706 also includes stator vanes 708 that are spaced by the uniform spacing US between stator vanes 708 that are not spaced by the first pair non-uniform gaps $NUG_1$, $NUG_2$ and the second pair non-uniform gaps $NUG_3$, $NUG_4$. For example, all remaining stator vanes 708 that are not spaced by the first pair non-uniform gaps $NUG_1$, $NUG_2$ and the second pair non-uniform gaps $NUG_3$, $NUG_4$ are spaced by the uniform spacing US. In FIG. 7, there are two stator vanes 708 that are spaced by the first non-uniform gap $NUG_1$, two stator vanes 708 that are spaced by the second non-uniform gap $NUG_2$, two stator vanes 708 that are spaced by the third non-uniform gap $NUG_3$, two stator vanes 708 that are spaced by the fourth non-uniform gap $NUG_4$, and eight stator vanes 708 that are spaced by the uniform spacing US. In this way, there are sixteen gaps total, including twelve gaps spaced by the uniform spacing US, and four non-uniform gaps ($NUG_1$, $NUG_2$, $NUG_3$, $NUG_4$). The first pair of non-uniform gaps $NUG_1$, $NUG_2$, the second pair of non-uniform gaps $NUG_3$, $NUG_4$, and the uniform spacing US may be defined by an angular measurement, as detailed above with respect to FIG. 3.

The first non-uniform gap $NUG_1$ is equal to the second non-uniform gap $NUG_2$. The first non-uniform gap $NUG_1$ can be selected to meet particular design constraints, such as, for example, particular aerodynamics, acoustics, or mechanical requirements. The third non-uniform gap $NUG_3$ is equal to the fourth non-uniform gap $NUG_4$. The first pair of non-uniform gaps $NUG_1$, $NUG_2$ is different from the second pair of non-uniform gaps $NUG_3$, $NUG_4$. The uniform spacing US is different from the first pair of non-uniform gaps $NUG_1$, $NUG_2$ and the second pair of non-uniform gaps $NUG_3$, $NUG_4$. In some embodiments, the uniform spacing US is substantially equal to the second pair of non-uniform gaps $NUG_3$, $NUG_4$. Configuring the stator assembly 706 to include at least two pairs of non-uniform gaps (NUGs) eliminates both the zero nodal diameter system response and the one nodal diameter system response by having the vibratory response be balanced, as detailed further below with respect to the example of FIGS. 8A to 8D. In FIG. 7, the third non-uniform gap $NUG_3$ and the fourth non-uniform gap $NUG_4$ are determined based on relationship (3), and the uniform spacing US is determined based on relationship (4):

$$NUG_3 = NUG_4 = \frac{(360° - 2(NUG_1) - (N_S - 4)US)}{2}. \quad (3)$$

In relationship (3), $N_S$ is a number of stator vanes 708, and US is the uniform spacing. $N_B$ and $N_S$ are selected such that the plurality of rotor blades 204 includes an even number of rotor blades 204 and the plurality of stator vanes 708 includes a number of stator vanes 708 that is evenly divisible by four, respectively.

In one embodiment, the uniform spacing US is determined based on relationship (4):

$$US = i\left(\frac{360°}{N_B}\right)\left(\frac{4}{N_S}\right). \quad (4)$$

In relationship (4), i is any positive integer, not equal to $N_S/4$. The positive integer i can be selected based on desired aerodynamics, acoustics, or mechanical requirements for a particular stator assembly 706, and is selected such that the uniform spacing US, the third non-uniform gap $NUG_3$, and the fourth non-uniform gap $NUG_4$ are positive values.

In another embodiment, the uniform spacing US is determined based on relationship (5):

$$US = \frac{360^\circ}{N_S - 4} - \frac{NUG_1}{\frac{N_S}{4} - 1} + \left(\frac{360^\circ}{N_B}\right)\left(\frac{4}{N_S}\right)\left(-1 + 2 \times j + \frac{N_B - N_S}{2}\right)\left(\frac{\frac{N_S}{8}}{\frac{N_S}{4} - 1}\right). \quad (5)$$

In relationship (5), j is any integer (e.g., positive or negative and including zero). The integer j can be selected based on desired aerodynamics, acoustics, or mechanical requirements for a particular stator assembly 706, and is selected such that the uniform spacing US, the third non-uniform gap $NUG_3$, and the fourth non-uniform gap $NUG_4$ are positive values.

Figure 8A:
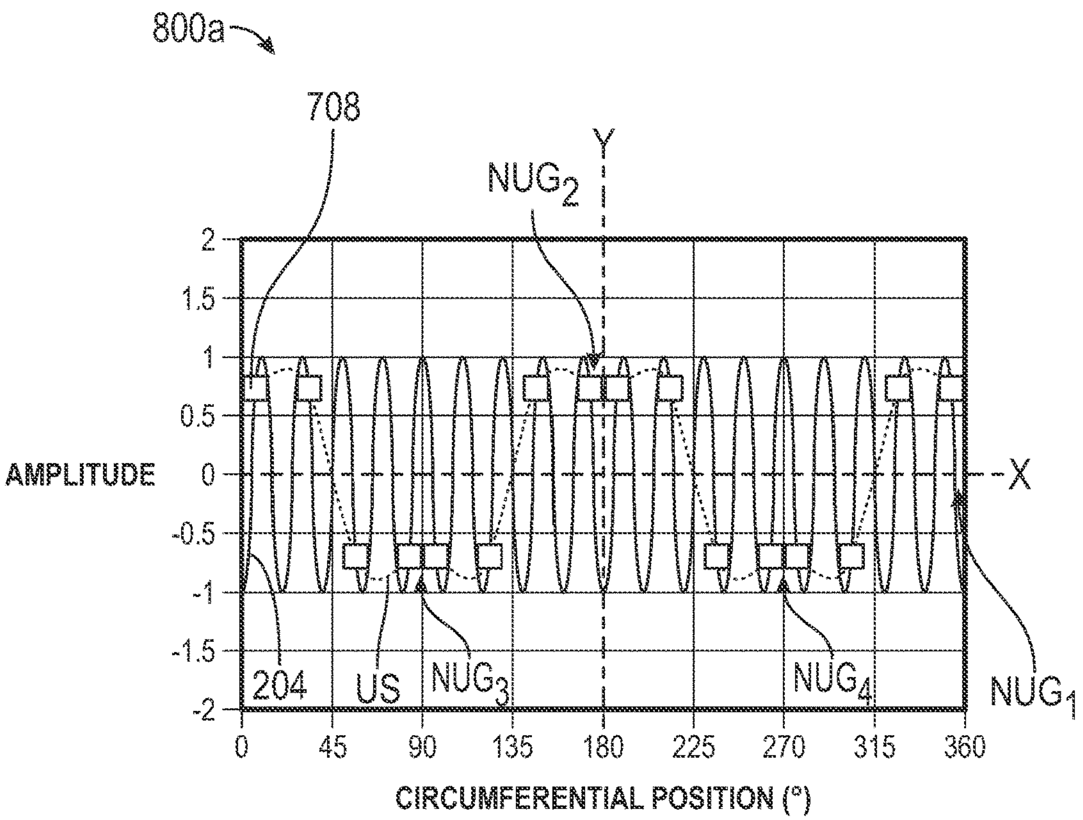
FIG. 8A illustrates a graph of a waveform of a stimulus of rotor blades of the rotor system of FIG. 2 at an initial condition (0° phase) and a vibration response on stator vanes of the stator assembly of FIG. 7, according to the present disclosure.
Figure 8B:
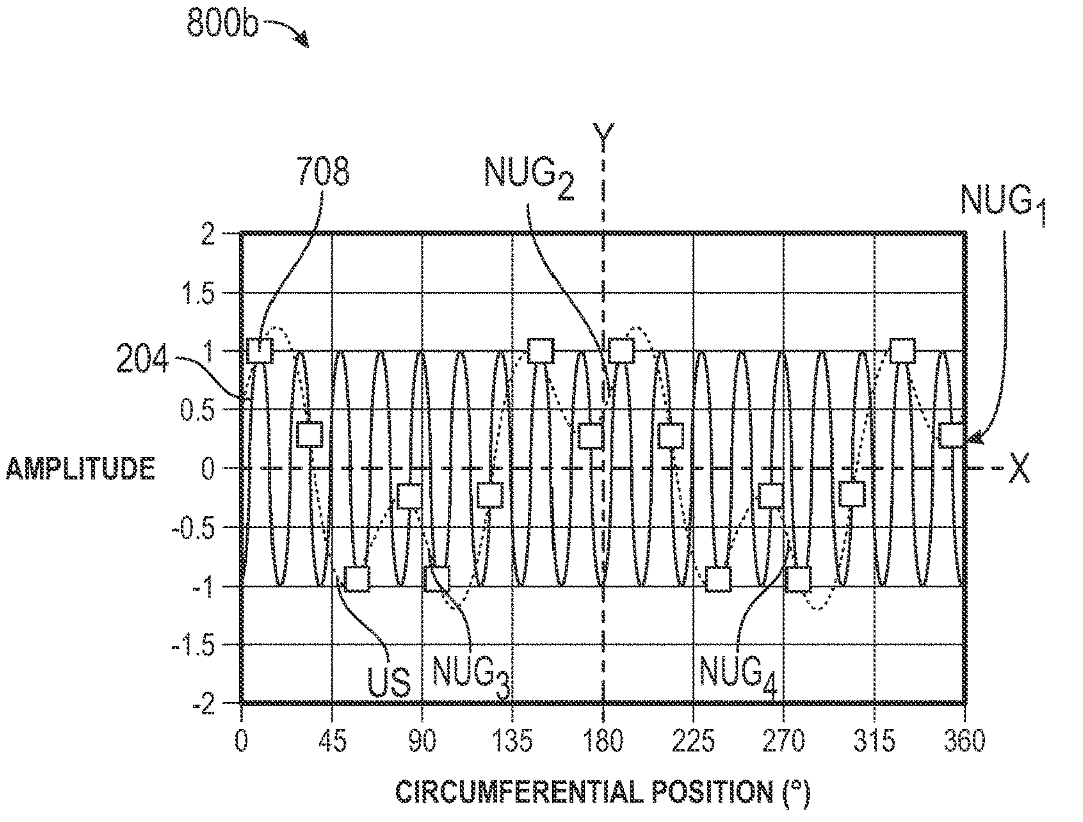
FIG. 8B illustrates a graph of the waveform of the stimulus of the rotor blades of the rotor system of FIG. 2 at a 30° phase shift and the vibration response on the stator vanes of the stator assembly of FIG. 7, according to the present disclosure.
Figure 8C:
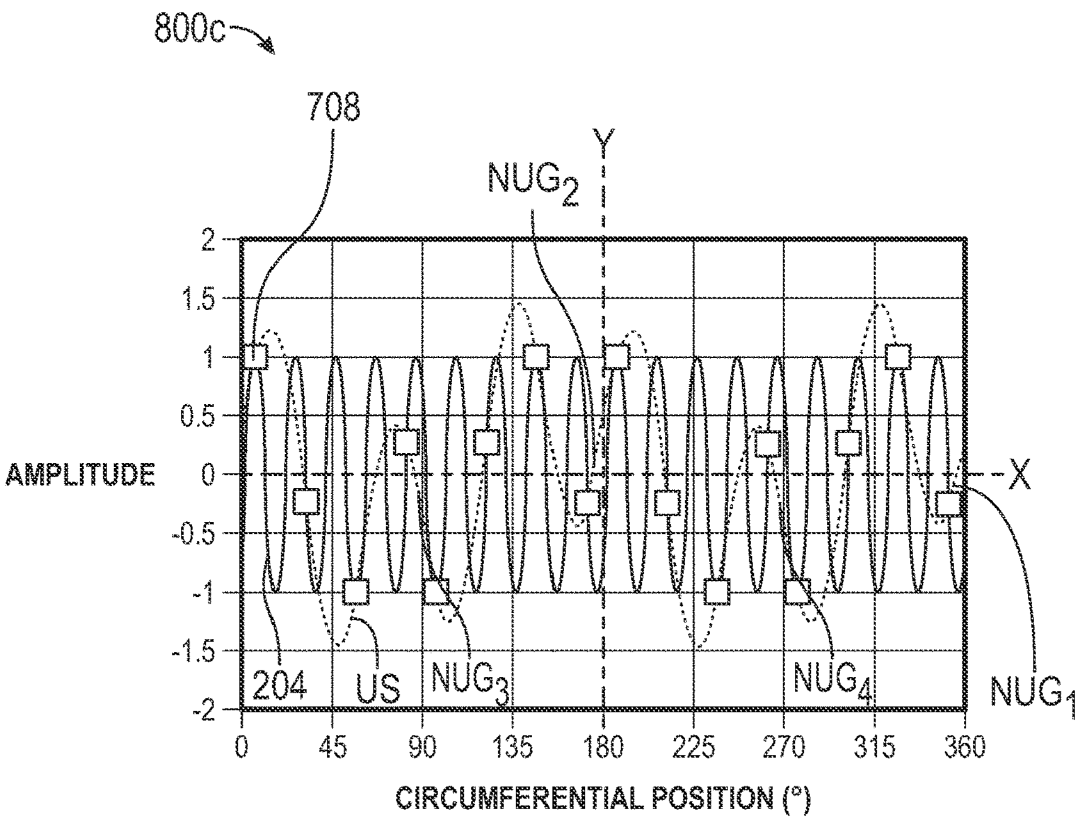
FIG. 8C illustrates a graph of the waveform of the stimulus of the rotor blades of the rotor system of FIG. 2 at a 60° phase shift and the vibration response on the stator vanes of the stator assembly of FIG. 7, according to the present disclosure.
Figure 8D:
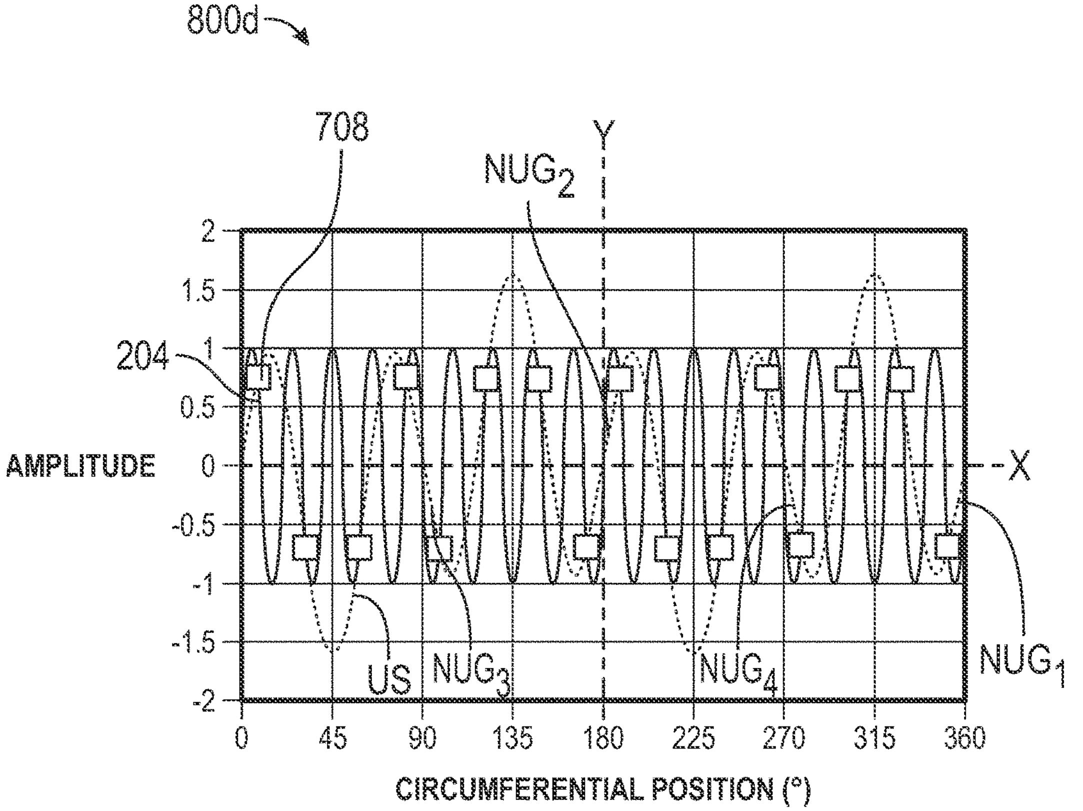
FIG. 8D illustrates a graph of the waveform of the stimulus of the rotor blades of the rotor system of FIG. 2 at a 90° phase shift and the vibration response on the stator vanes of the stator assembly of FIG. 7, according to the present disclosure.

FIGS. 8A to 8D illustrate exemplary graphs of a waveform of a stimulus from the rotor blades 204 on each of the stator vanes 708 at various phases, according to the present disclosure. The waveform of the rotor blades 204 is a sinusoidal waveform. FIG. 8A illustrates a graph 800*a* of the waveform of the rotor blades 204 at an initial condition (0° phase). FIG. 8B illustrates a graph 800*b* of the waveform of the rotor blades 204 at a 30° phase shift. FIG. 8C illustrates a graph 800*c* of the waveform of the rotor blades 204 at a 60° phase shift. FIG. 8D illustrates a graph 800*d* of the waveform of the rotor blades 204 at a 90° phase shift. In FIGS. 8A to 8D, the stimulus from the rotor blades 204 is represented by a sine wave as the rotor blades 204 rotate, and the stator vanes 708 are represented by squares at various circumferential positions of the stator assembly 706 (FIG. 7). FIGS. 8A to 8D show the uniform spacing US, the first non-uniform gap $NUG_1$, the second non-uniform gap $NUG_2$, the third non-uniform gap $NUG_3$, and the fourth non-uniform gap $NUG_4$.

FIGS. 8A to 8D illustrate a third example of the at least one pair of non-uniform gaps. The third example provides exemplary values of the first pair of non-uniform gaps $NUG_1$, $NUG_2$, the second pair of non-uniform gaps $NUG_3$, $NUG_4$, and the uniform spacing US. In this example, the rotor assembly 202 includes eighteen rotor blades 204 and the stator assembly 706 includes sixteen stator vanes 708. The uniform spacing US is determined based on relationship (4), above. Thus, if the integer i is five, NB is eighteen, and NS is sixteen, the uniform spacing US is approximately twenty-five degrees (25°) based on relationship (4). The first non-uniform gap $NUG_1$ equals the second non-uniform gap $NUG_2$, and the first non-uniform gap $NUG_1$ and the second non-uniform gap $NUG_2$ are selected to be approximately fifteen degrees (15°). The third non-uniform gap $NUG_3$ and the fourth non-uniform gap $NUG_4$ are determined by relationship (3), above, and the third non-uniform gap $NUG_3$ equals the second non-uniform gap $NUG_4$. Thus, if $N_B$ is eighteen, $N_S$ is sixteen, the uniform spacing US is approximately 25°, and the first non-uniform gap $NUG_1$ is approximately 15°, then the third non-uniform gap $NUG_3$ and the fourth non-uniform gap $NUG_4$ are approximately fifteen degrees (15°) per relationship (3).

As shown in FIGS. 8A to 8D, the vibration response on the stator vanes 708 is balanced about the X-axis and the Y-axis. For example, the vibration response of the eight stator vanes 708 that are positioned between 0° to 180° on the stator assembly 706 is equal to the vibration response of the eight stator vanes 708 that are positioned between 180° to 360° on the stator assembly 706 as the phase changes from the initial condition (graph 800*a* in FIG. 8D) to the 90° phase shift (graph 800*d* in FIG. 8D) about both the X-axis and the Y-axis. In this way, the vibration response of the eight stator vanes 708 that are positioned between 0° to 180° on the stator assembly 706 is repeated by the vibration response of the eight stator vanes 708 that are positioned between 180° to 360° about the X-axis and the Y-axis such that the vibration response of the stator vanes 708 is balanced about the X-axis and the Y-axis. Accordingly, the stator assembly 706 having at least one pair of non-uniform gaps including a first pair of non-uniform gaps $NUG_1$, $NUG_2$ that are equal and a second pair of non-uniform gaps $NUG_3$, $NUG_4$ eliminates both the zero nodal diameter system response and the one nodal diameter system response. In this way, the unbalanced force between the twelve o'clock position 720 and the six o'clock position 724 and the unbalanced moment between the three o'clock position 722 and the nine o'clock position 726 are eliminated as compared to stator assemblies without the benefit of the present disclosure. Thus, the stator assembly 706 having at least one pair of non-uniform gaps including a first pair of non-uniform gaps $NUG_1$, $NUG_2$ and a second pair of non-uniform gaps $NUG_3$, $NUG_4$ prevents the zero nodal diameter system response (e.g., prevents the unbalanced force) and the one nodal diameter system response (e.g., prevents the unbalanced moment) through the turbine engine 10 (FIG. 1).

Figure 9A:
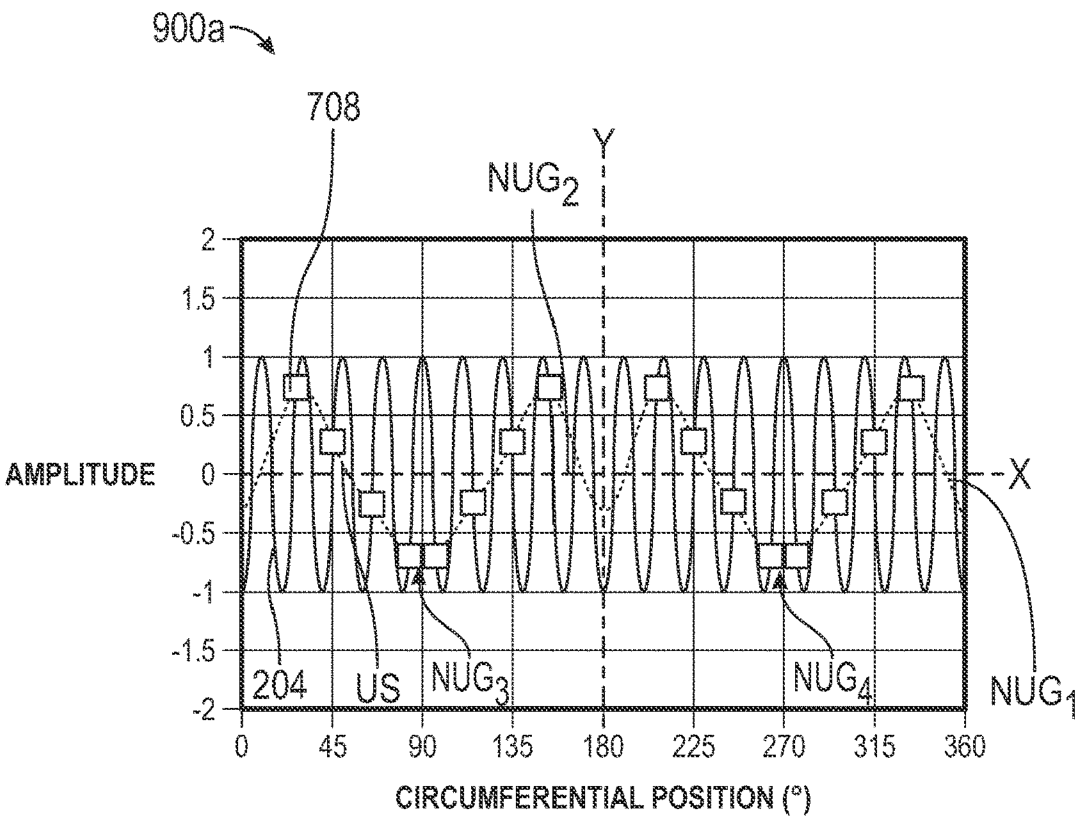
FIG. 9A illustrates a graph of a waveform of a stimulus of rotor blades of the rotor system of FIG. 2 at an initial condition (0° phase) and a vibration response on stator vanes of the stator assembly of FIG. 7, according to another embodiment.
Figure 9B:
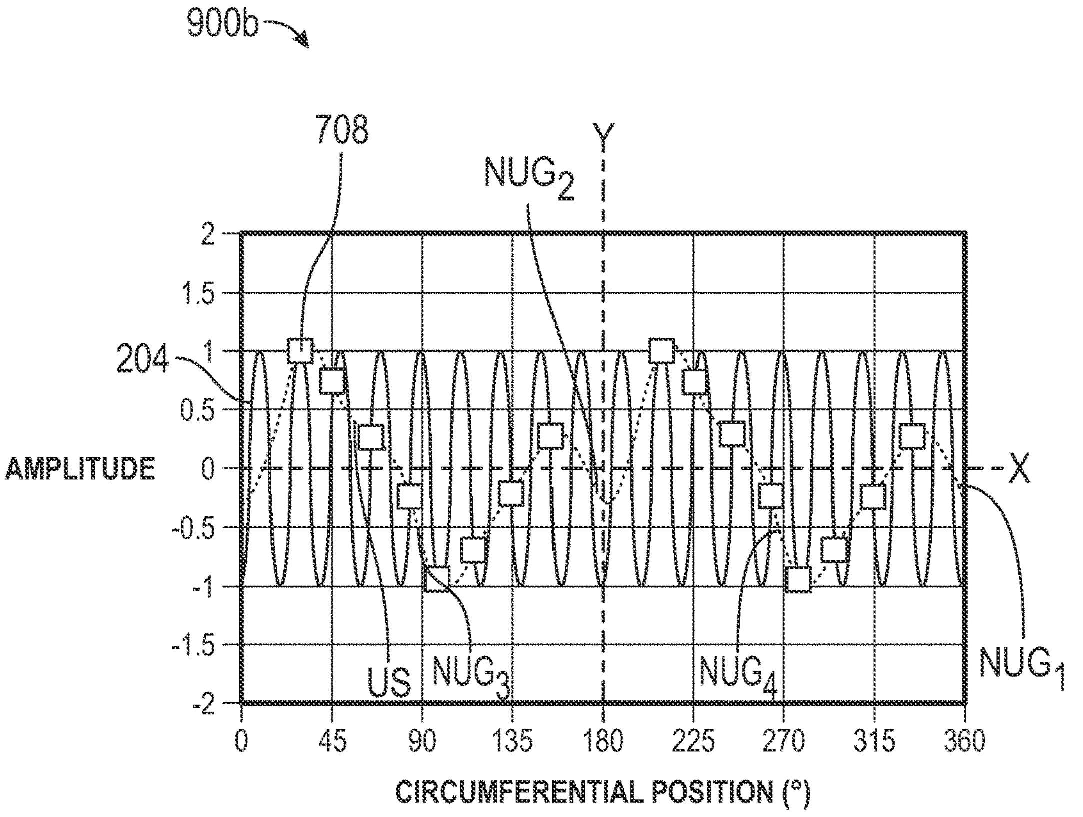
FIG. 9B illustrates a graph of the waveform of the stimulus of the rotor blades of the rotor system of FIG. 2 at a 30° phase shift and the vibration response on the stator vanes of the stator assembly of FIG. 7, according to another embodiment.
Figure 9C:
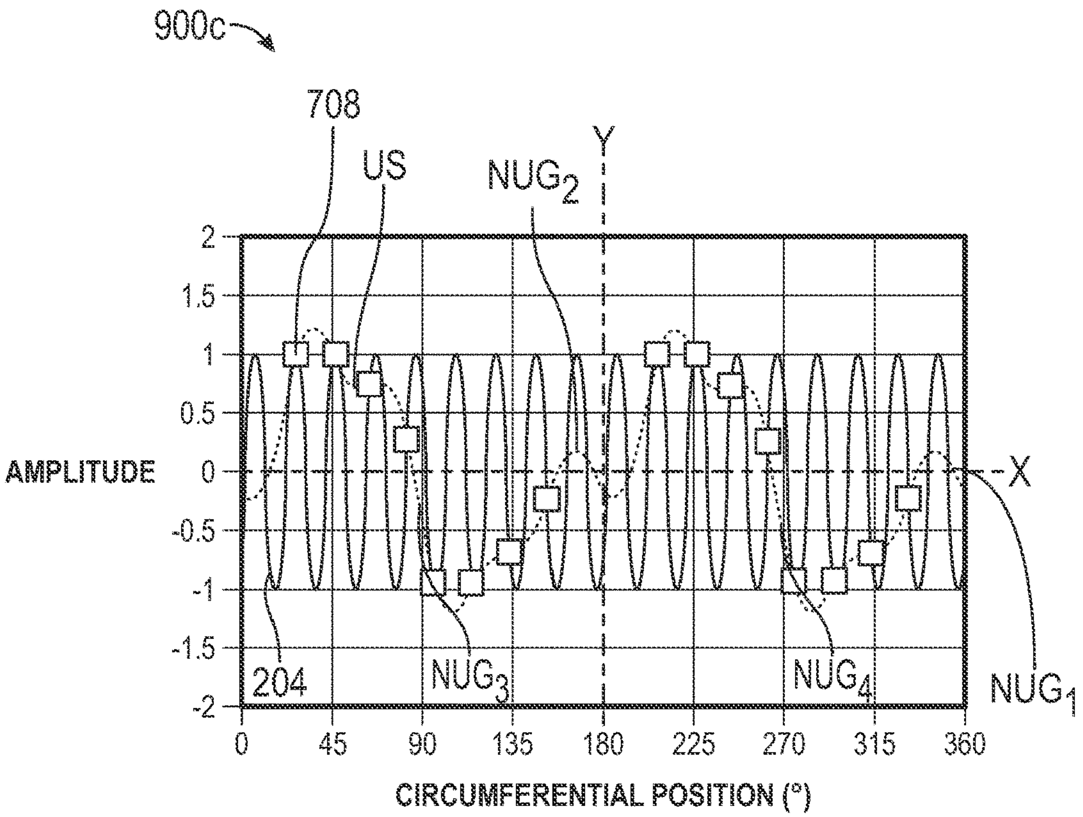
FIG. 9C illustrates a graph of the waveform of the stimulus of the rotor blades of the rotor system of FIG. 2 at a 60° phase shift and the vibration response on the stator vanes of the stator assembly of FIG. 7, according to another embodiment.
Figure 9D:
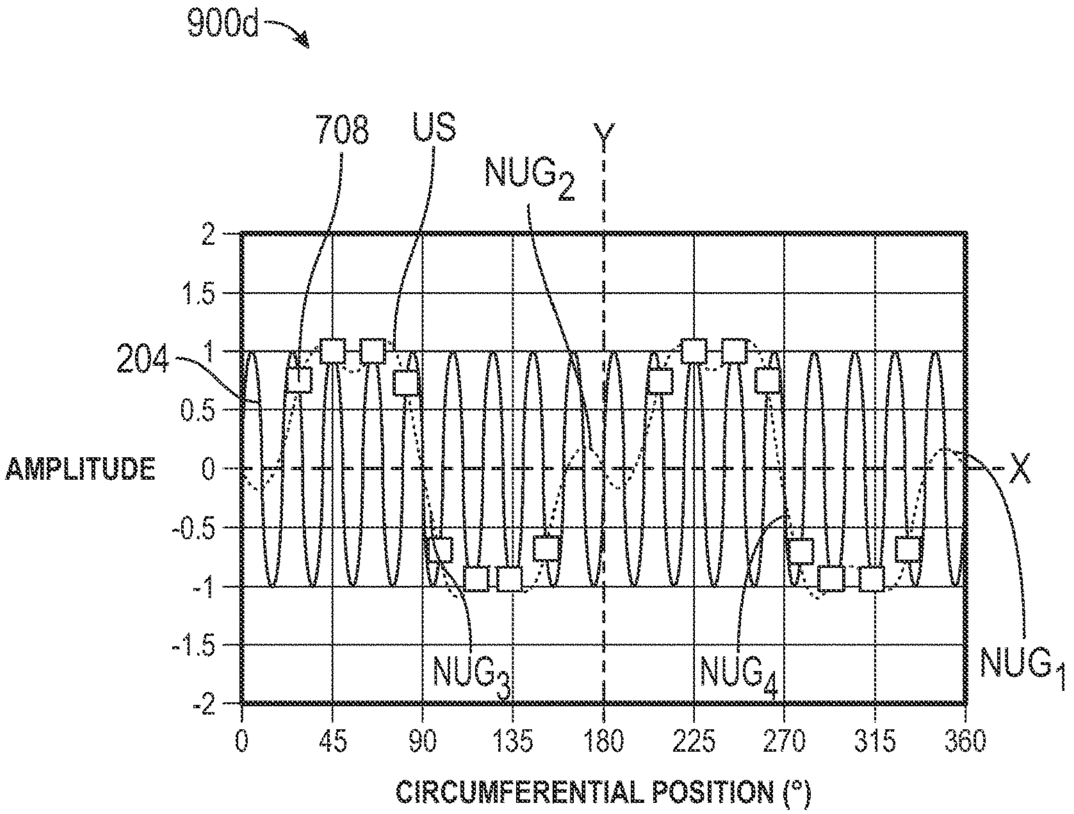
FIG. 9D illustrates a graph of the waveform of the stimulus of the rotor blades of the rotor system of FIG. 2 at a 90° phase shift and the vibration response on the stator vanes of the stator assembly of FIG. 7, according to another embodiment.

FIGS. 9A to 9D illustrate exemplary graphs of a waveform of a stimulus from the rotor blades 204 on each of the stator vanes 708 at various phases, according to another embodiment. The waveform of the rotor blades 204 is a sinusoidal waveform. FIG. 9A illustrates a graph 900*a* of a waveform of the rotor blades 204 at an initial condition (0° phase). FIG. 9B illustrates a graph 900*b* of the waveform of the rotor blades 204 at a 30° phase shift. FIG. 9C illustrates a graph 900*c* of the waveform of the rotor blades 204 at a 60° phase shift. FIG. 9D illustrates a graph 900*d* of the waveform of the rotor blades 204 at a 90° phase shift. In FIGS. 9A to 9D, the waveform of the rotor blades 204 is represented by a sine wave as the rotor blades 204 rotate, and the stator vanes 708 are represented by squares at various circumferential positions of the stator assembly 706 (FIG. 7). FIGS. 9A to 9D show the uniform spacing US, the first non-uniform gap $NUG_1$, the second non-uniform gap $NUG_2$, the third non-uniform gap $NUG_3$, and the fourth non-uniform gap $NUG_4$.

FIGS. 9A to 9D illustrate a fourth example of the at least one pair of non-uniform gaps. The fourth example provides exemplary values of the first pair of non-uniform gaps $NUG_1$, $NUG_2$, the second pair of non-uniform gaps $NUG_3$, $NUG_4$, and the uniform spacing US. In this example, the rotor assembly 202 includes eighteen rotor blades 204 and the stator assembly 706 includes sixteen stator vanes 708. The first non-uniform gap $NUG_1$ equals the second non-uniform gap $NUG_2$ and is selected to be approximately fifty-five degrees (55°). The uniform spacing US is determined based on relationship (5), above. Thus, if the integer j is one, $N_B$ is eighteen, and $N_S$ is sixteen, and the first non-uniform gap $NUG_1$ is approximately 55°, the uniform spacing US is approximately eighteen point three degrees 18.3° based on relationship (5). The third non-uniform gap $NUG_3$ and the fourth non-uniform gap $NUG_4$ are determined by relationship (3), above, and the third non-uniform gap $NUG_3$ equals the second non-uniform gap $NUG_4$. Thus, if $N_B$ is eighteen, $N_S$ is sixteen, the first non-uniform gap $NUG_1$ is approximately 55°, and the uniform spacing US is approximately 18.3°, then the third non-uniform gap $NUG_3$ and the fourth non-uniform gap NUG4 are approximately fifteen degrees (15°) per relationship (3).

As shown in FIGS. 9A to 9D, the vibration response on the stator vanes 708 is balanced about the X-axis and the Y-axis. For example, the vibration response of the eight stator vanes 708 that are positioned between 0° to 180° on the stator assembly 706 is equal to the vibration response of the eight stator vanes 708 that are positioned between 180° to 360° on the stator assembly 706 as the phase changes from the initial condition (graph 900*a* in FIG. 9D) to the 90° phase shift (graph 900*d* in FIG. 9D) about both the X-axis and the Y-axis. In this way, the vibration response of the eight stator vanes 708 that are positioned between 0° to 180° on the stator assembly 706 is repeated by the vibration response of the eight stator vanes 708 that are positioned between 180° to 360° about the X-axis and the Y-axis such that the vibration response of the stator vanes 708 is balanced about the X-axis and the Y-axis. Accordingly, the stator assembly 706 having at least one pair of non-uniform gaps including a first pair of non-uniform gaps $NUG_1$, $NUG_2$ that are equal and a second pair of non-uniform gaps $NUG_3$, $NUG_4$ eliminates both the zero nodal diameter system response and the one nodal diameter system response. In this way, the unbalanced force between the twelve o'clock position 720 and the six o'clock position 724, and the unbalanced moment between the three o'clock position 722 and the nine o'clock position 726 are eliminated as compared to stator assemblies without the benefit of the present disclosure. Thus, the stator assembly 706 having at least one pair of non-uniform gaps including a first pair of non-uniform gaps $NUG_1$, $NUG_2$ and a second pair of non-uniform gaps $NUG_3$, $NUG_4$ prevents the zero nodal diameter system response (e.g., prevents the unbalanced force) and the one nodal diameter system response (e.g., prevents the unbalanced moment) through the turbine engine 10 (FIG. 1).

Accordingly, the present disclosure provides a stator assembly having at least one pair of non-uniform gaps between adjacent stator vanes to eliminate, or to prevent, at least one of the zero nodal diameter system response (e.g., the unbalanced force) or the one nodal diameter system response (e.g., the unbalanced moment). The at least one pair of non-uniform gaps are opposing non-uniform gaps such that the at least one pair of non-uniform gaps is separated by one hundred eighty degrees (180°). The at least one pair of opposing non-uniform gaps of the stator assembly includes a first non-uniform gap between a first group of two adjacent stator vanes and a second non-uniform gap between a second group of two adjacent stator vanes. The first non-uniform gap is different than the second non-uniform gap to eliminate, or to prevent, the zero nodal diameter system response. The first non-uniform gap is equal to the second non-uniform gap to eliminate, or to prevent, the one nodal diameter system response. The at least one pair of opposing non-uniform gaps includes two pairs of opposing non-uniform opposing gaps to eliminate, or to prevent, both the zero nodal diameter system response and the one nodal diameter system response. Thus, the present disclosure provides for eliminating, or preventing, at least one of the zero nodal diameter system response (e.g., the unbalanced force) or the one nodal diameter system response (e.g., the unbalanced moment).

Further aspects are provided by the subject matter of the following clauses.

A rotor system for a turbine engine, the rotor system having a longitudinal centerline axis and comprises a rotor assembly including a plurality of rotor blades, the plurality of rotor blades rotating about the longitudinal centerline axis, and a stator assembly including a plurality of stator vanes arranged circumferentially about the stator assembly and including at least one pair of non-uniform gaps between adjacent stator vanes, the plurality of stator vanes comprises a first group of stator vanes having a first non-uniform gap of the at least one pair of non-uniform gaps between adjacent stator vanes of the first group of stator vanes, and a second group of stator vanes having a second non-uniform gap of the at least one pair of non-uniform gaps between adjacent stator vanes of the second group of stator vanes, the first non-uniform gap being positioned 180° from the second non-uniform gap, and a third group of stator vanes having a uniform spacing between adjacent stator vanes of the third group of stator vanes, and the plurality of rotor blades direct air through the plurality of stator vanes.

The rotor system of the proceeding clause, the number of stator vanes of the stator assembly being even.

The rotor system of any proceeding clause, the number of rotor blades of the plurality of rotor blades being even.

The rotor system of any proceeding clause, the plurality of rotor blades being uniformly spaced circumferentially about the rotor assembly.

The rotor system of any proceeding clause, the stator assembly being positioned downstream of the rotor assembly.

The rotor system of any proceeding clause, the at least one pair of non-uniform gaps being sized to prevent at least one of a zero nodal diameter system response or a one nodal diameter response.

The rotor system of any proceeding clause, the air directed through the plurality of stator vanes causes a vibration response on the plurality of stator vanes, and the at least one pair of non-uniform gaps balances the vibration response on the plurality of stator vanes about the stator assembly.

The rotor system of any proceeding clause, the first group of stator vanes includes two stator vanes of the plurality of stator vanes, and the second group of stator vanes includes two stator vanes of the plurality of stator vanes.

The rotor system of any proceeding clause, the first non-uniform gap being defined by a number of rotor blades of the plurality of rotor blades, a number of stator vanes of the plurality of stator vanes, and the uniform spacing.

The rotor system of any proceeding clause, the second non-uniform gap being defined by the number of stator vanes of the plurality of stator vanes, the uniform spacing, and the first non-uniform gap.

The rotor system of any preceding clause, the rotor system being in a fan section of the turbine engine.

The rotor system of any preceding clause, the rotor system being in a compressor section of the turbine engine.

The rotor system of any preceding clause, the rotor system being in a turbine section of the turbine engine.

The rotor system of any preceding clause, the rotor assembly being coupled to a rotating shaft of the turbine engine.

The rotor system of any preceding clause, the rotating shaft being at least one of a fan shaft, a high-pressure shaft, or a low-pressure shaft.

The rotor system of any preceding clause, the plurality of stator vanes not rotating circumferentially about the longitudinal centerline axis.

The rotor system of any preceding clause, the number of rotor blades of the plurality of rotor blades being even.

The rotor system of any preceding clause, the number of stator vanes of the plurality of stator vanes being even.

The rotor system of any preceding clause, the number of stator vanes of the plurality of stator vanes being evenly divisible by four.

The rotor system of any preceding clause, the at least one pair of non-uniform gaps being positioned at a twelve o'clock position and a six o'clock position of the stator assembly.

The rotor system of any preceding clause, the first non-uniform gap being different than the second non-uniform gap.

The rotor system of any preceding clause, the first non-uniform gap being greater than the second non-uniform gap.

The rotor system of any preceding clause, the first non-uniform gap being equal to the second non-uniform gap.

The rotor system of any preceding clause, the at least one pair of non-uniform gaps includes at least two pairs of non-uniform gaps including a first pair of non-uniform gaps and a second pair of non-uniform gaps.

The rotor system of any preceding clause, the first pair of non-uniform gaps being spaced 90° from the second pair non-uniform gaps.

The rotor system of any preceding clause, the second pair of non-uniform gaps including a third non-uniform gap and a fourth non-uniform gap.

The rotor system of any preceding clause, the third non-uniform gap being spaced 180° from the fourth non-uniform gap.

The rotor system of any preceding clause, the third non-uniform gap being equal to the fourth non-uniform gap.

The rotor system of any preceding clause, the third non-uniform gap being positioned at a three o'clock position of the stator assembly, and the fourth non-uniform gap being positioned at a nine o'clock position of the stator assembly.

The rotor system of any preceding clause, the at least one pair of non-uniform gaps being defined by an angular measurement.

The rotor system of any preceding clause, the uniform spacing being defined by an angular measurement.

The rotor system of any preceding clause, the angular measurement being defined by a spacing measured with respect to an angle between adjacent stator vanes.

The rotor system of any preceding clause, the first non-uniform gap being given by $$180° + \frac{180°}{N_B} - \left(\frac{(N_S - 2)}{2}\right)$$

US, $N_B$ being a number of rotor blades of the plurality of rotor blades, $N_S$ being a number of stator vanes of the plurality of stator vanes, and US being the uniform spacing.

The rotor system of any preceding clause, the second non-uniform gap being given by $360° - NUG_1 - (N_S - 2)US$, $NUG_1$ being the first non-uniform gap.

The rotor system of any preceding clause, the third non-uniform gap and the fourth non-uniform gap being given by $$\frac{(360° - 2(NUG_1) - (N_S - 4)US)}{2}.$$

The rotor system of any preceding clause, the uniform spacing being different than the at least one pair of non-uniform gaps.

The rotor system of any preceding clause, the uniform spacing being determined based on if there were a same number of stator vanes as the number of rotor blades.

The rotor system of any preceding clause, the uniform spacing being determined based on if there were one less stator vane than the number of rotor blades.

The rotor system of any preceding clause, the uniform spacing being given by $i(360°/N_B)(4/N_S)$, i being any positive integer that is not equal to $N_S/4$.

The rotor system of any preceding clause, the uniform spacing being given by $$\frac{360°}{N_S - 4} - \frac{NUG_1}{\frac{N_S}{4} - 1} + \left(\frac{360°}{N_B}\right)\left(\frac{4}{N_S}\right)\left(-1 + 2 \times j + \frac{N_B - N_S}{2}\right)\left(\frac{\frac{N_S}{8}}{\frac{N_S}{4} - 1}\right),$$

j being any integer.

A turbine engine having a longitudinal centerline axis and comprises a rotating shaft, the rotating shaft being at least one of a fan shaft, a high-pressure shaft, or a low-pressure shaft, and a rotor system comprises a rotor assembly including a plurality of rotor blades, the rotor assembly coupled to the rotating shaft and the plurality of rotor blades rotating about the longitudinal centerline axis, and a stator assembly including a plurality of stator vanes arranged circumferentially about the stator assembly and including at least one pair of non-uniform gaps between adjacent stator vanes, the plurality of stator vanes comprises a first group of stator vanes having a first non-uniform gap of the at least one pair of non-uniform gaps between adjacent stator vanes of the first group of stator vanes, a second group of stator vanes having a second non-uniform gap of the at least one pair of non-uniform gaps between adjacent stator vanes of the second group of stator vanes, the first non-uniform gap being positioned 180° from the second non-uniform gap, and a third group of stator vanes having a uniform spacing between adjacent stator vanes of the third group of stator vane, the plurality of rotor blades direct air through the plurality of stator vanes.

The turbine engine of the preceding clause, the number of stator vanes of the stator assembly being even.

The turbine engine of any preceding clause, the number of rotor blades of the plurality of rotor blades being even.

The turbine engine of any preceding clause, the plurality of rotor blades being uniformly spaced circumferentially about the rotor assembly.

The turbine engine of any preceding clause, the stator assembly being positioned downstream of the rotor assembly.

The turbine engine of any preceding clause, the at least one pair of non-uniform gaps being sized to prevent at least one of a zero nodal diameter system response or a one nodal diameter response.

The turbine engine of any preceding clause, the air directed through the plurality of stator vanes causes a vibration response on the plurality of stator vanes, and the at least one pair of non-uniform gaps balances the vibration response on the plurality of stator vanes about the stator assembly.

The turbine engine of any preceding clause, the first group of stator vanes includes two stator vanes of the plurality of stator vanes, and the second group of stator vanes includes two stator vanes of the plurality of stator vanes.

The turbine engine of any preceding clause, the first non-uniform gap being defined by a number of rotor blades of the plurality of rotor blades, a number of stator vanes of the plurality of stator vanes, and the uniform spacing.

The turbine engine of any preceding clause, the second non-uniform gap being defined by the number of stator vanes of the plurality of stator vanes, the uniform spacing, and the first non-uniform gap.

The turbine engine of any preceding clause, the rotor system being in a fan section of the turbine engine.

The turbine engine of any preceding clause, the rotor system being in a compressor section of the turbine engine.

The turbine engine of any preceding clause, the rotor system being in a turbine section of the turbine engine.

The turbine engine of any preceding clause, the plurality of stator vanes not rotating circumferentially about the longitudinal centerline axis.

The turbine engine of any preceding clause, the number of rotor blades of the plurality of rotor blades being even.

The turbine engine of any preceding clause, the number of stator vanes of the plurality of stator vanes being even.

The turbine engine of any preceding clause, the number of stator vanes of the plurality of stator vanes being evenly divisible by four.

The turbine engine of any preceding clause, the at least one pair of non-uniform gaps being positioned at a twelve o'clock position and a six o'clock position of the stator assembly.

The turbine engine of any preceding clause, the first non-uniform gap being different than the second non-uniform gap.

The turbine engine of any preceding clause, the first non-uniform gap being greater than the second non-uniform gap.

The turbine engine of any preceding clause, the first non-uniform gap being equal to the second non-uniform gap.

The turbine engine of any preceding clause, the at least one pair of non-uniform gaps includes at least two pairs of non-uniform gaps including a first pair of non-uniform gaps and a second pair of non-uniform gaps.

The turbine engine of any preceding clause, the first pair of non-uniform gaps being spaced 90° from the second pair non-uniform gaps.

The turbine engine of any preceding clause, the second pair of non-uniform gaps including a third non-uniform gap and a fourth non-uniform gap.

The turbine engine of any preceding clause, the third non-uniform gap being spaced 180° from the fourth non-uniform gap.

The turbine engine of any preceding clause, the third non-uniform gap being equal to the fourth non-uniform gap.

The turbine engine of any preceding clause, the third non-uniform gap being positioned at a three o'clock position of the stator assembly, and the fourth non-uniform gap being positioned at a nine o'clock position of the stator assembly.

The turbine engine of any preceding clause, the at least one pair of non-uniform gaps being defined by an angular measurement.

The turbine engine of any preceding clause, the uniform spacing being defined by an angular measurement.

The turbine engine of any preceding clause, the angular measurement being defined by a spacing measured with respect to an angle between adjacent stator vanes.

The turbine engine of any preceding clause, the first non-uniform gap being given by $$180^\circ + \frac{180^\circ}{N_B} - \left(\frac{(N_S - 2)}{2}\right)$$

US, $N_B$ being a number of rotor blades of the plurality of rotor blades, $N_S$ being a number of stator vanes of the plurality of stator vanes, and US being the uniform spacing.

The turbine engine of any preceding clause, the second non-uniform gap being given by $360^\circ - NUG_1 - (N_S - 2)US$, $NUG_1$ being the first non-uniform gap.

The turbine engine of any preceding clause, the third non-uniform gap and the fourth non-uniform gap being given by $$\frac{(360^\circ - 2(NUG_1) - (N_S - 4)US)}{2}.$$

The turbine engine of any preceding clause, the uniform spacing being different than the at least one pair of non-uniform gaps.

The turbine engine of any preceding clause, the uniform spacing being determined based on if there were a same number of stator vanes as the number of rotor blades.

The turbine engine of any preceding clause, the uniform spacing being determined based on if there were one less stator vane than the number of rotor blades.

The turbine engine of any preceding clause, the uniform spacing being given by $i(360^\circ/N_B)(4/N_S)$, i being any positive integer that is not equal to $N_S/4$.

The turbine engine of any preceding clause, the uniform spacing being given by $$\frac{360^\circ}{N_S - 4} - \frac{NUG_1}{\frac{N_S}{4} - 1} + \left(\frac{360^\circ}{N_B}\right)\left(\frac{4}{N_S}\right)\left(-1 + 2 \times j + \frac{N_B - N_S}{2}\right)\left(\frac{\frac{N_S}{8}}{\frac{N_S}{4} - 1}\right),$$

j being any integer.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A rotor system for a turbine engine, the rotor system having a longitudinal centerline axis and comprising:
- a rotor assembly including a plurality of rotor blades, the plurality of rotor blades rotating about the longitudinal centerline axis; and
- a stator assembly including a plurality of stator vanes arranged circumferentially about the stator assembly and including at least one pair of non-uniform gaps between adjacent stator vanes, the plurality of stator vanes comprising:
  - a first group of stator vanes having a first non-uniform gap of the at least one pair of non-uniform gaps between adjacent stator vanes of the first group of stator vanes;
  - a second group of stator vanes having a second non-uniform gap of the at least one pair of non-uniform gaps between adjacent stator vanes of the second group of stator vanes, the first non-uniform gap being equal to, and positioned 180° from, the second non-uniform gap;

a third group of stator vanes having a uniform spacing between adjacent stator vanes of the third group of stator vanes;

a fourth group of stator vanes having a third non-uniform gap of the at least one pair of non-uniform gaps between adjacent stator vanes of the fourth group of stator vanes; and a fifth group of stator vanes having a fourth non-uniform gap of the at least one pair of non-uniform gaps between adjacent stator vanes of the fifth group of stator vanes, the third non-uniform gap being equal to, and positioned 180° from, the fourth non-uniform gap, and the third non-uniform gap and the fourth non-uniform gap being different than the first non-uniform gap and the second non-uniform gap, wherein the plurality of rotor blades direct air through the plurality of stator vanes.

2. The rotor system of claim 1, wherein a number of stator vanes of the stator assembly is even.

3. The rotor system of claim 1, wherein a number of rotor blades of the plurality of rotor blades is even.

4. The rotor system of claim 1, wherein the plurality of rotor blades is uniformly spaced circumferentially about the rotor assembly.

5. The rotor system of claim 1, wherein the stator assembly is positioned downstream of the rotor assembly.

6. The rotor system of claim 1, wherein the at least one pair of non-uniform gaps is sized to prevent a zero nodal diameter system response and a one nodal diameter response.

7. The rotor system of claim 1, wherein the air directed through the plurality of stator vanes causes a vibration response on the plurality of stator vanes, and the at least one pair of non-uniform gaps balances the vibration response on the plurality of stator vanes about the stator assembly.

8. The rotor system of claim 1, wherein the first group of stator vanes includes two stator vanes of the plurality of stator vanes, and the second group of stator vanes includes two stator vanes of the plurality of stator vanes.

9. The rotor system of claim 1, wherein the first non-uniform gap is a function of a number of rotor blades of the plurality of rotor blades, a number of stator vanes of the plurality of stator vanes, and the uniform spacing.

10. The rotor system of claim 9, wherein the second non-uniform gap is a function of defined by the number of stator vanes of the plurality of stator vanes, the uniform spacing, and the first non-uniform gap.

11. A turbine engine having a longitudinal centerline axis and comprising:

a rotating shaft, the rotating shaft being at least one of a fan shaft, a high-pressure shaft, or a low-pressure shaft; and a rotor system comprising:

a rotor assembly including a plurality of rotor blades, the rotor assembly coupled to the rotating shaft and the plurality of rotor blades rotating about the longitudinal centerline axis; and a stator assembly including a plurality of stator vanes arranged circumferentially about the stator assembly and including at least one pair of non-uniform gaps between adjacent stator vanes, the plurality of stator vanes comprising:

a first group of stator vanes having a first non-uniform gap of the at least one pair of non-uniform gaps between adjacent stator vanes of the first group of stator vanes;

a second group of stator vanes having a second non-uniform gap of the at least one pair of non-uniform gaps between adjacent stator vanes of the second group of stator vanes, the first non-uniform gap being equal to, and positioned 180° from, the second non-uniform gap;

a third group of stator vanes having a uniform spacing between adjacent stator vanes of the third group of stator vanes;

a fourth group of stator vanes having a third non-uniform gap of the at least one pair of non-uniform gaps between adjacent stator vanes of the fourth group of stator vanes; and a fifth group of stator vanes having a fourth non-uniform gap of the at least one pair of non-uniform gaps between adjacent stator vanes of the fifth group of stator vanes, the third non-uniform gap being equal to, and positioned 180° from, the fourth non-uniform gap, and the third non-uniform gap and the fourth non-uniform gap being different than the first non-uniform gap and the second non-uniform gap, wherein the plurality of rotor blades direct air through the plurality of stator vanes.

12. The turbine engine of claim 11, wherein a number of stator vanes of the stator assembly is even.

13. The turbine engine of claim 11, wherein a number of rotor blades of the plurality of rotor blades is even.

14. The turbine engine of claim 11, wherein the plurality of rotor blades is uniformly spaced circumferentially about the rotor assembly.

15. The turbine engine of claim 11, wherein the stator assembly is positioned downstream of the rotor assembly.

16. The turbine engine of claim 11, wherein the at least one pair of non-uniform gaps is sized to prevent a zero nodal diameter system response and a one nodal diameter response.

17. The turbine engine of claim 11, wherein the air directed through the plurality of stator vanes causes a vibration response on the plurality of stator vanes, and the at least one pair of non-uniform gaps balances the vibration response on the plurality of stator vanes about the stator assembly.

18. The turbine engine of claim 11, wherein the first group of stator vanes includes two stator vanes of the plurality of stator vanes, and the second group of stator vanes includes two stator vanes of the plurality of stator vanes.

19. The turbine engine of claim 11, wherein the first non-uniform gap is a function of a number of rotor blades of the plurality of rotor blades, a number of stator vanes of the plurality of stator vanes, and the uniform spacing.

20. The turbine engine of claim 19, wherein the second non-uniform gap is a function of the number of stator vanes of the plurality of stator vanes, the uniform spacing, and the first non-uniform gap.

* * * * *